(12) United States Patent
Dowd et al.

(10) Patent No.: US 9,367,149 B2
(45) Date of Patent: Jun. 14, 2016

(54) CHARGING MECHANISM THROUGH A CONDUCTIVE STYLUS NOZZLE

(71) Applicant: Adobe Systems Incorporated, San Jose, CA (US)

(72) Inventors: Geoffrey Dowd, San Francisco, CA (US); Way Chet Lim, Menlo Park, CA (US); Timothy Van Ruitenbeek, Berkeley, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 280 days.

(21) Appl. No.: 13/856,070

(22) Filed: Apr. 3, 2013

(65) Prior Publication Data

US 2014/0300586 A1    Oct. 9, 2014

(51) Int. Cl.
| | |
|---|---|
| *G09G 5/00* | (2006.01) |
| *G06F 3/0354* | (2013.01) |
| *G06F 1/26* | (2006.01) |
| *G06F 3/044* | (2006.01) |

(52) U.S. Cl.
CPC ............ *G06F 3/03545* (2013.01); *G06F 1/266* (2013.01); *G06F 3/044* (2013.01)

(58) Field of Classification Search
CPC . G06F 3/0334; G06F 3/03545; G06F 3/0354; G06F 3/044; G06F 1/266
USPC .............................. 345/179; 178/19.01–19.06
See application file for complete search history.

(56) References Cited

U.S. PATENT DOCUMENTS

| | | | |
|---|---|---|---|
| D294,263 S | 2/1988 | Rodgers et al. | |
| D327,476 S | 6/1992 | Valls et al. | |
| D342,652 S | 12/1993 | Wensley et al. | |
| 5,973,677 A | * 10/1999 | Gibbons | ............... G06F 1/1626 178/18.04 |
| D419,043 S | 1/2000 | Staton | |
| D419,541 S | 1/2000 | Kawashima | |

(Continued)

FOREIGN PATENT DOCUMENTS

| | | | |
|---|---|---|---|
| EP | 2146414 A1 | 1/2010 | |
| WO | PCT/US93/02778 | * 10/1993 | .................... 345/179 |

OTHER PUBLICATIONS

WSJ Staff; Samsung Unveils Tablet, Readies Phone; The Wall Street Journal; Digits Technology News and Insights; Feb. 25, 2013; 4 pages.

(Continued)

*Primary Examiner* — Jennifer Nguyen
(74) *Attorney, Agent, or Firm* — Shook, Hardy & Bacon, L.L.P.

(57) ABSTRACT

Input devices and methods for charging input devices are disclosed. A stylus input device has a tip configured to interact with a touch computing device and a body connected to the tip. The stylus has a nozzle housing between its body and tip, electrical components, and an internal rechargeable power source. The internal power source can store power received via a connection between an external power source and a conductive surface on the nozzle housing and supply power to the stylus' electrical components. A method for charging a stylus determines whether power is being received via an electrical connection between a conductive surface on a nozzle of the stylus and an external power source and then determines an amount of power stored in the stylus' battery. If the stylus is receiving power from the external power source and the battery is not fully charged, the method charges the rechargeable battery.

20 Claims, 9 Drawing Sheets

(56) References Cited

U.S. PATENT DOCUMENTS

| | | | |
|---|---|---|---|
| D457,402 S | 5/2002 | Heck et al. | |
| D472,924 S | 4/2003 | Pan | |
| 6,563,494 B1 | 5/2003 | Eichstaedt et al. | |
| 6,648,536 B1 | 11/2003 | Bellue | |
| D522,579 S | 6/2006 | Sim | |
| D523,709 S | 6/2006 | Knox | |
| D537,309 S | 2/2007 | Wang | |
| D547,141 S | 7/2007 | Shan | |
| D557,086 S | 12/2007 | Lipscomb et al. | |
| D585,489 S | 1/2009 | Han | |
| D615,588 S | 5/2010 | Hillemann | |
| D615,589 S | 5/2010 | Hillemann | |
| D628,031 S | 11/2010 | Stokes et al. | |
| D628,032 S | 11/2010 | Stokes et al. | |
| D630,067 S | 1/2011 | Block et al. | |
| D640,106 S | 6/2011 | Molina et al. | |
| D641,755 S | 7/2011 | Rashid et al. | |
| D642,032 S | 7/2011 | Molina et al. | |
| D681,038 S | 4/2013 | Tomohiro | |
| 8,438,640 B1 | 5/2013 | Vaish et al. | |
| 8,841,881 B2 | 9/2014 | Failing | |
| 8,878,823 B1 * | 11/2014 | Kremin et al. | 345/179 |
| 2001/0001430 A1 | 5/2001 | Ely et al. | |
| 2003/0097410 A1 | 5/2003 | Atkins et al. | |
| 2006/0001654 A1 | 1/2006 | Smits | |
| 2006/0101064 A1 | 5/2006 | Strong et al. | |
| 2006/0108976 A1 | 5/2006 | Chen | |
| 2006/0291701 A1 | 12/2006 | Tanaka | |
| 2007/0143379 A1 | 6/2007 | i Dalfo et al. | |
| 2007/0174246 A1 | 7/2007 | Sigurdsson et al. | |
| 2008/0046425 A1 | 2/2008 | Perski | |
| 2008/0169132 A1 | 7/2008 | Ding et al. | |
| 2008/0189659 A1 | 8/2008 | Krutzler | |
| 2009/0175491 A1 | 7/2009 | Charpentier | |
| 2009/0204681 A1 | 8/2009 | Sun | |
| 2009/0244015 A1 | 10/2009 | Sengupta et al. | |
| 2009/0251432 A1 | 10/2009 | Wang et al. | |
| 2009/0287841 A1 | 11/2009 | Chapweske et al. | |
| 2010/0021022 A1 | 1/2010 | Pittel et al. | |
| 2010/0079404 A1 | 4/2010 | Degner et al. | |
| 2010/0131675 A1 | 5/2010 | Pan | |
| 2010/0164434 A1 * | 7/2010 | Cacioppo et al. | 320/115 |
| 2010/0216107 A1 | 8/2010 | Hines | |
| 2010/0289812 A1 | 11/2010 | Kobayashi et al. | |
| 2010/0318534 A1 | 12/2010 | Kaufman et al. | |
| 2011/0279081 A1 | 11/2011 | Cacioppo et al. | |
| 2011/0316472 A1 | 12/2011 | Han et al. | |
| 2012/0079578 A1 | 3/2012 | Dachiraju et al. | |
| 2012/0105362 A1 | 5/2012 | Kremin et al. | |
| 2012/0226983 A1 | 9/2012 | Goldenberg et al. | |
| 2013/0106722 A1 | 5/2013 | Shahparnia et al. | |
| 2013/0141456 A1 | 6/2013 | Sokolov et al. | |
| 2013/0154956 A1 | 6/2013 | Tudosoiu | |
| 2013/0234999 A1 | 9/2013 | Kuno | |
| 2013/0278550 A1 | 10/2013 | Westhues | |
| 2014/0188978 A1 | 7/2014 | Ng et al. | |
| 2014/0253467 A1 | 9/2014 | Hicks et al. | |
| 2014/0253469 A1 | 9/2014 | Hicks et al. | |

OTHER PUBLICATIONS http://www.tenonedesign.com/connect.php; last accessed on Apr. 3, 2013.

Notice of Allowance dated Aug. 31, 2015 in U.S. Appl. No. 13/855,997, 5 pages.

Non-Final Office Action dated Mar. 3, 2015 in U.S. Appl. No. 29/467,046, 6 pages.

Notice of Allowance dated May 21, 2015 in U.S. Appl. No. 29/467,046, 5 pages.

Non-Final Office Action dated Sep. 18, 2014 in U.S. Appl. No. 13/835,959, 21 pages.

Final Office Action dated Feb. 12, 2015 in U.S. Appl. No. 131835,959, 23 pages.

Notice of Allowance dated Sep. 5, 2013 in U.S. Appl. No. 29/453,913, 9 pages.

Non-Final Office Action dated May 4, 2015 in U.S. Appl. No. 13/855,997, 12 pages.

First Action Interview Pre-Interview Communication dated Jun. 26, 2015 in U.S. Appl. No. 13/840,746, 6 pages.

Internet Article, Review: Samsung Galaxy Note 10.1 tablet is mightier with pen—CNN.com, Harry McCracken, 3 pgs., Aug. 17, 2012 http://cpf.cleanprint.net/cpd/cpf?action=print&type=filePrint&key=cnn&url=http%3A%2F.

Non-Final Office Action dated Jun. 20, 2014 in U.S. Appl. No. 13/572,231, 19 pages.

Final Office Action dated Nov. 6, 2014 in U.S. Appl. No. 13/572,231, 21 pages.

Non-Final Office Action dated Mar. 5, 2015 in U.S. Appl. No. 13/572,231, 21 pages.

Notice of Allowance dated Jul. 8, 2015 in U.S. Appl. No. 13/572,231, 8 pages.

First Action Interview Pre-Interview Communication dated Jul. 1, 2015 in U.S. Appl. No. 13/839,441, 7 pages.

Non-Final Office Action dated Jul. 17, 2015 in U.S. Appl. No. 13/841,089, 29 pages.

Final Office Action dated Nov. 12, 2015 in U.S. Appl. No. 13/840,746, 26 pages.

Final Office Action dated Nov. 27, 2015 in U.S. Appl. No. 13/839,441, 22 pages.

Final Office Action dated Mar. 17, 2016 in U.S. Appl. No. 13/841,089, 29 pages.

Non-Final Office Action dated Mar. 22, 2016 in U.S. Appl. No. 13/840,746, 31 pages.

Non-Final Office Action dated Mar. 22, 2016 in U.S. Appl. No. 13/839,441, 31 pages.

* cited by examiner

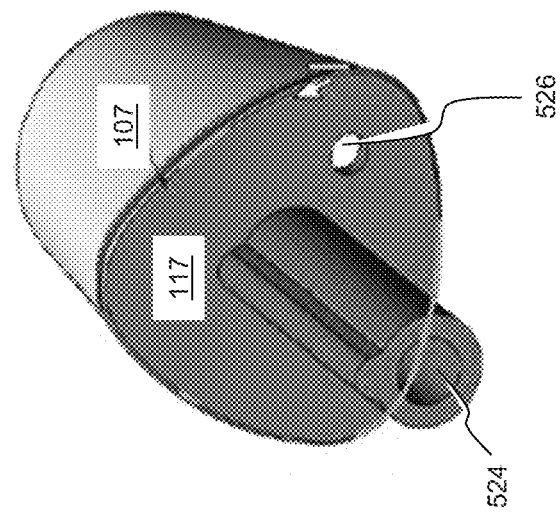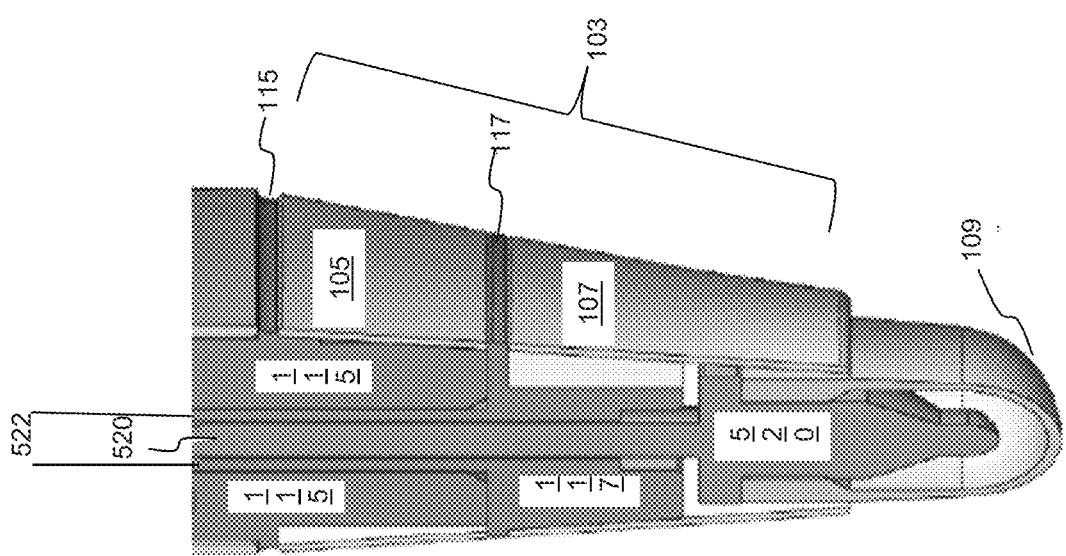
FIG. 5B

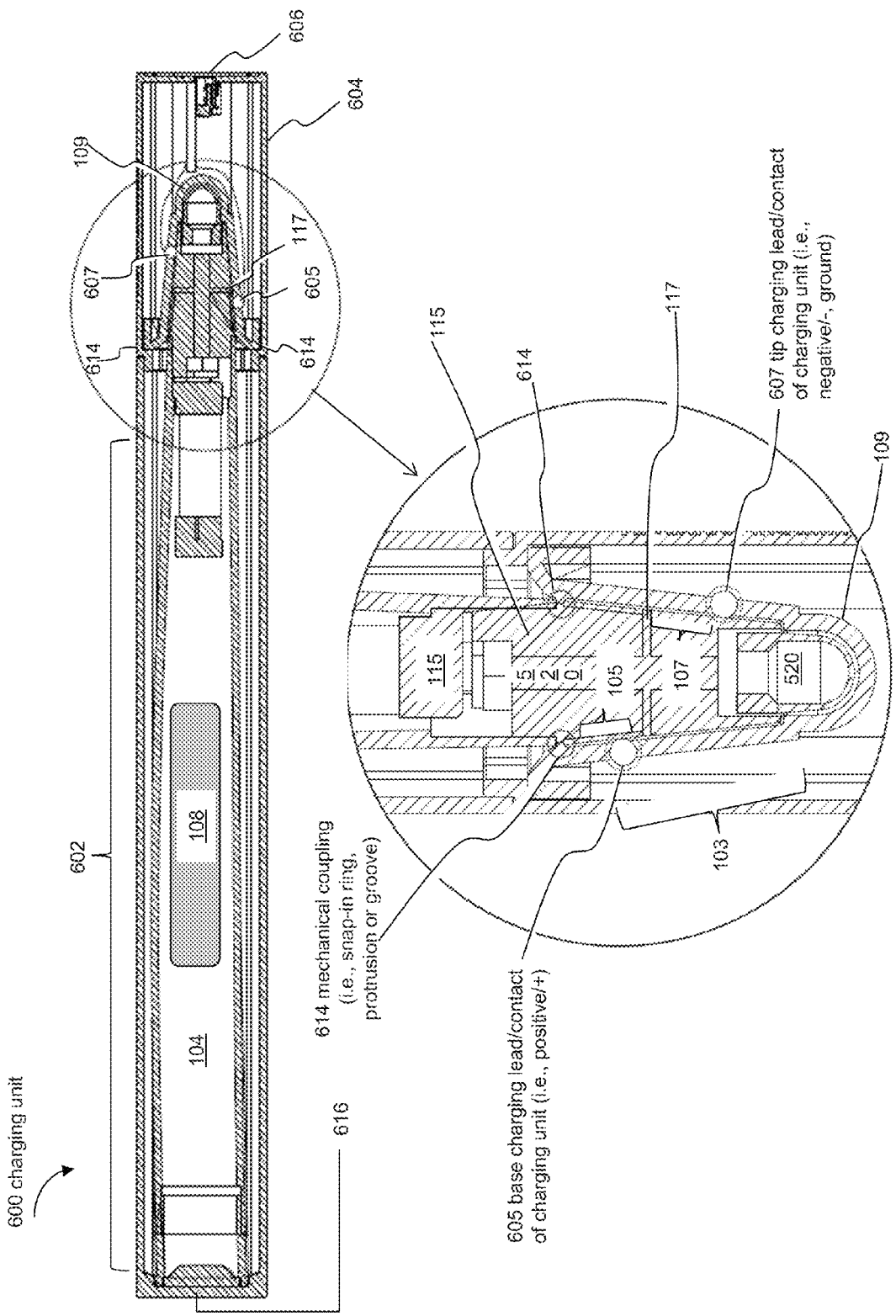

CHARGING MECHANISM THROUGH A CONDUCTIVE STYLUS NOZZLE

TECHNICAL FIELD

This disclosure relates generally to electronic computing devices and more particularly relates to rechargeable input devices used with touch screen computing devices.

BACKGROUND

Conventional touch screen computing devices have been configured to identify the positioning and/or movement of one or more fingers or other objects on or near touch surfaces of the devices. For example, touch screens associated with some touch computing devices have been configured for receiving input via finger gestures and to perform one or more functions in response to those finger gestures. Certain touch screen computing devices can receive input from input devices such as stylus devices. A stylus is a writing, drawing, or pointing instrument or utensil that is generally configured to be hand-held and, in the context of touch screen computing devices, used to interact with a touch surface. For example, touch screen computing devices have identified input based on one end of the stylus moving on or near the touch surface of the computing device. Styli (or styluses) have been used with personal digital assistant devices, tablet computing devices, smart phones, and other touch screen computing devices for handwriting, drawing, selecting icons, and providing other forms of input to such touch computing devices.

Some styli include a radio, a wireless transceiver, or other means for wirelessly communicating with touch computing devices. Some styli include a light emitting diode (LED) or other means to indicate that the stylus is powered on or communicating with a touch computing device. Such features require power, and because styli are typically wireless, power is supplied by internal batteries within the styli. As a result, styli with internal electronics require their own, internal power supply. Prior solutions involved incorporating user-replaceable batteries, such as AAA and AAAA-sized cells, into styli. However, the relatively larger size and weight of replaceable batteries as compared to captive batteries necessitate larger and heavier styli. Elongated and tubular input devices such as styli that use cylindrical, replaceable batteries, such as AAA and AAAA cells, have wider bodies than more slender writing and drawing instruments, such as traditional pens and pencils. The increased width and weight of such input devices does not ergonomically enhance their use as styli and may cause discomfort during extended periods of use. In addition to adding size and girth to styli, many replaceable batteries are not rechargeable and must be periodically replaced. In cases where rechargeable, replaceable batteries are used in a stylus, such batteries typically need to be removed from the stylus in order to be charged outside of the stylus in a battery charger.

In order to address the size and weight issues implicit in use of traditional replaceable batteries, some styli are powered by relatively smaller, slenderer captive batteries. Because such captive batteries are not user-replaceable, these styli cannot be used without being periodically recharged. Regardless of whether a stylus uses a replaceable or captive battery, prior solutions for charging a stylus include using a wired connection between a stylus and a power source via a, plug, port, or receptacle built into the stylus or including magnetic materials in the stylus so that the stylus can be magnetically coupled to a power source. While these traditional techniques allow the stylus to connect via a wired or magnetic connection to a power source, they add unwanted weight and size to the stylus. Another technique for charging or recharging mobile devices is inductive charging using wireless, inductive coupling between an inductive charging station or mat and a device having a battery to be charged. However, inductive charging may not be feasible for devices with metal housings or cases. For example, a metal housing for a stylus body may interfere with wireless, inductive power transfer. Inductive charging requires inclusion of an induction coil within the device whose battery is being recharged. Some inductive coupling techniques use magnets and magnetic material within a device to be charged to ensure that the device remains in close enough proximity to the power source to be inductively charged. Each of these charging technologies and techniques have the drawbacks of adding size and weight to the devices being charged, thus making them less aesthetically pleasing and not ergonomically enhancing their use as styli. In addition, incorporating magnetic materials and induction coils into styli can interfere with electronic components, including wireless transceivers, contained within some active styli.

SUMMARY

Disclosed herein are input devices configured to accept an electrical charge from an external power source at contacts of a conductive surface and transfer the charge to an internal rechargeable power source. Methods for charging an input device using a conductive surface of the input device as a charging contact are disclosed. An exemplary method accepts an electrical charge at the conductive surface from a charging contact of an external power source and then transfers the charge to an internal rechargeable power source in the input device, such as a battery.

According to one exemplary embodiment, an input device includes a body connected by a coupling member to a tip configured to interact with a touch surface of a computing device. The input device also includes a nozzle housing coupled to the body. The nozzle housing encases a portion of the coupling member between the tip and the body. The nozzle housing has at least one conductive surface at least one conductive surface disposed between the body and the tip. The input device further includes one or more electrical components and an internal rechargeable power source. The internal rechargeable power source is configured to store electrical power received via an electrical connection between an external power source and the at least one conductive surface and supply power to the one or more electrical components.

According to another exemplary embodiment, a method for charging a rechargeable battery of a stylus includes determining whether power is being received via an electrical connection between at least one contact on a conductive surface of the stylus and at least one charging lead of an external power source. The exemplary method determines an amount of power stored in the rechargeable battery and if it is determined that the stylus is receiving power from the external power source and that the rechargeable battery is not fully charged, the method charges the rechargeable battery from the external power source.

In yet another embodiment, a stylus has a nozzle housing proximate to an end of the stylus where a tip of the stylus is located. A conductive, external surface of the nozzle housing includes base and tip contacts. The base and tip contacts are separated from each other by one or more insulators. The stylus has an internal, rechargeable power source, such as a rechargeable battery, configured to store energy received as electrical power via an interface with an external power source. The internal, rechargeable power source has a sufficient storage capacity to supply power to electrical components of the stylus for a duration of time without requiring a connection to an external power source.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented. The structure and operation of various embodiments are described in detail below with reference to the accompanying drawings. Such embodiments are presented herein for illustrative purposes only. Additional embodiments will be apparent to persons skilled in the relevant art(s) based on the teachings contained herein.

BRIEF DESCRIPTION OF THE FIGURES

Exemplary embodiments are best understood from the following detailed description when read in conjunction with the accompanying drawings. It is emphasized that, according to common practice, the various features of the drawings are not to scale. On the contrary, the dimensions of the various features may be arbitrarily expanded or reduced for clarity. Included in the drawings are the following figures:

FIGS. 5A and 5B provide cross-sectional side and perspective views of electrical contacts and insulators of an input device; according to certain embodiments;

FIG. 6 provides a detailed cross-sectional view of an input device illustrated in FIGS. 1-4 within an exemplary a charging unit;

Figure 1:
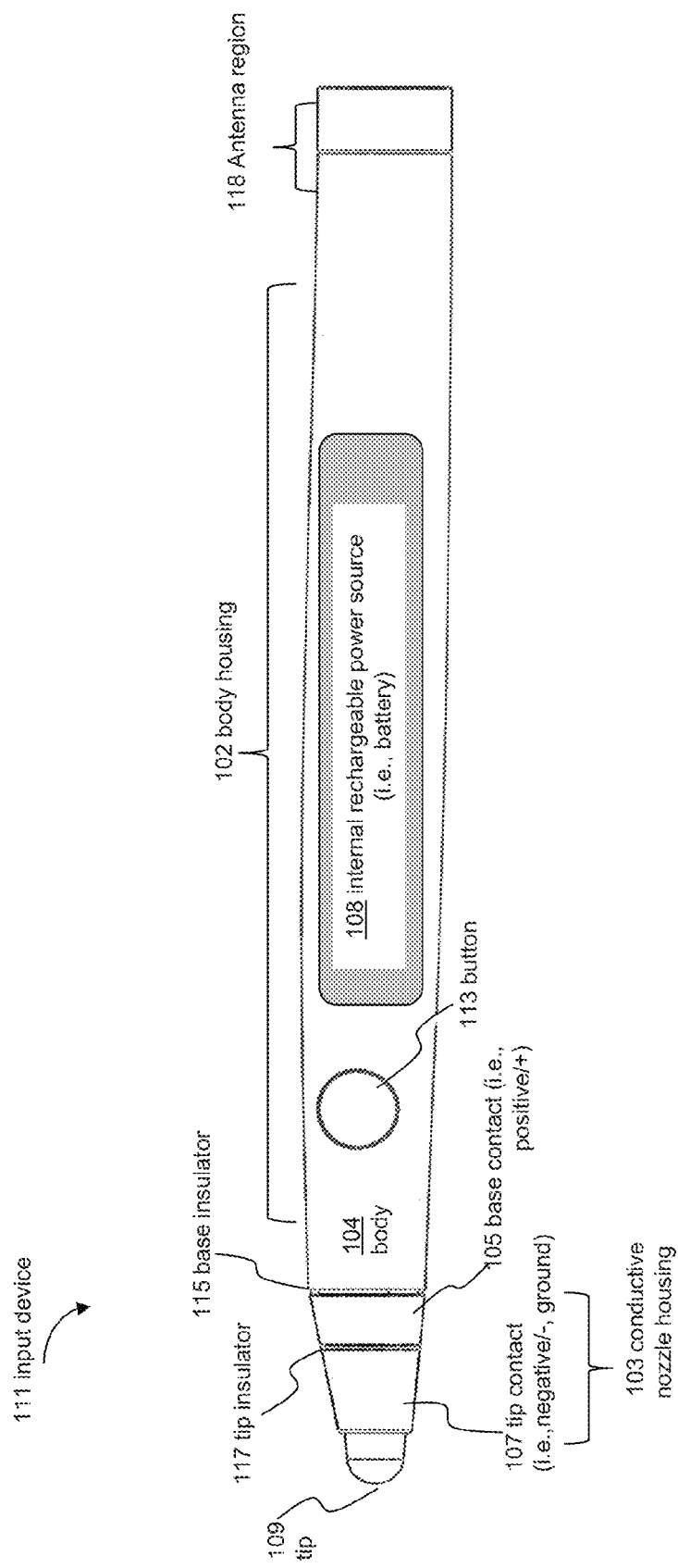
FIG. 1 is a side view of a view of an input device, according to certain embodiments.

Embodiments of the present invention will now be described with reference to the accompanying drawings. In the drawings, generally, common or like reference numbers indicate identical or functionally similar elements. Additionally, generally, the left-most digit(s) of a reference number identifies the drawing in which the reference number first appears.

DETAILED DESCRIPTION

Apparatuses and methods are disclosed for charging an input device, such as a multifunctional stylus. The stylus includes a rechargeable battery or other suitable energy storage device and functions as a device for interacting with one or more touch computing devices. The input device is adapted to receive electrical power from an external power source via contacts of an external, conductive surface of the input device and charge its internal rechargeable battery.

One exemplary embodiment includes an input device such as a stylus. The stylus is configured to interact with one or more touch computing devices and includes a tip at one end of the stylus, the tip being configured to interact with a touch surface of a computing device. The stylus is capable of receiving a charge when an electrical connection is formed between contacts on an exterior, conductive surface of the stylus and charging contacts of an external power source. In an embodiment, one or more of the contacts can be located on a surface of a nozzle housing near the tip of the stylus and separated from each other by one or more insulators. In accordance with an embodiment, the contacts are configured to accept an electrical connection from an external power source and receive electrical power (i.e., energy) from the external power source. The stylus is configured to transfer the received electrical power to terminals of its internal rechargeable power source (i.e., its battery) so as to charge its rechargeable power source.

As used herein, the term "conductive" refers to a property of any object or material that is capable of conducting electrical energy. In embodiments, a conductive surface of an input device is any surface that is electrically conductive. For example, a conductive surface can refer to any surface comprising a material which permits the flow of electric charges through it. Non-limiting examples of conductive materials include metallic and metal conductors such as, but not limited to, brass, copper, and aluminum.

As used herein, the term "nonconductive" refers to a property of any object or material whose internal electric charges do not flow freely, and which therefore does not conduct an electric current, under the influence of an electric field. In embodiments, a nonconductive material is any material useable as an electrical insulator. For example, a nonconductive material can refer to any a material having a sufficiently high resistivity to be usable as an electrical insulator for voltages produced by electrical components and/or batteries of an external power source and the input device. Non-limiting examples of nonconductive materials include electrical insulators and plastics such as acrylonitrile butadiene styrene (ABS) plastic.

As used herein, the term "input device" refers to any device usable to interact with an interface of a computing device. An input device may be a pointing/drawing device such as a stylus. Input devices can be configured to interact with a touch-sensitive interface of a computing device, such as a touch surface or a touch-sensitive display. As used herein, a "stylus" refers to any writing, drawing, or pointing instrument or utensil that is generally configured to be hand-held and, in the context of touch screen computing devices, used to interact with a computing device having a touch-sensitive interface or touch surface (i.e., a touch computing device). The terms "input device" and "stylus" are used interchangeably herein to refer broadly and inclusively to any type of input device capable of interacting with a touch computing device.

These illustrative examples are given to introduce the reader to the general subject matter discussed here and are not intended to limit the scope of the disclosed concepts. The following sections describe various additional embodiments and examples with reference to the drawings in which like numerals indicate like elements. For brevity, only the differences occurring within the Figures, as compared to previous or subsequent ones of the figures, are described below.

Exemplary Input Devices with Conductive Charging Surfaces

An exemplary input device having a conductive charging surface is described below with reference to FIGS. 1-4. FIG. 1A include various views of an input device configured to receive a charge via one or more external, conductive contacts.

FIG. 1 shows a side view of a stylus input device 111 with a body 104 having a button 113 and an internal rechargeable power source 108 for the input device 111. The body 104 is encased in a body housing 102 extending from an antenna region 118 near one end of the input device 111 to a conductive nozzle housing 103 at the other end. In cases where the input device 111 is a stylus with an elongated body like the exemplary body 104, the body housing 102 will be an elongated (or elongate) housing configured to accept the body 104 and connect to the tip 109 through the nozzle housing 103 of the stylus. The body 104 can be connected to the tip 109 via a coupling element (see, e.g., element 520 in FIGS. 5A and 5B).

In certain embodiments, the antenna region 118 includes an antenna used by a wireless transceiver in the body 104. For example, an input device 111 embodied as a multifunction stylus may include a radio or wireless transceiver, such as a Bluetooth® transceiver, a wireless network transceiver, and/or some other wireless transceiver configured to transmit and receive communications via an antenna within the antenna region 118.

As shown in FIG. 1, the nozzle housing 103 includes a base contact 105 and a tip contact 107. The base and tip contacts 105 and 107 are disposed in different regions or portions of the exterior surface of the nozzle housing 103. Although FIGS. 1-6 depict two contacts 105 and 107 on the nozzle housing 103, in alternative embodiments, a single contact on a conductive region or surface of the nozzle housing 103 can be used to charge the input device. In this embodiment, a second contact, such as a negative (−) or ground contact, can be located elsewhere on the input device, such on a conductive region or portion of the body 104, the body housing 102, and/or the antenna region 118.

The base and tip contacts 105 and 107 can be electrically insulated from each other by a tip insulator 117. FIG. 1 also shows that the end of the input device 111 distal from the antenna region 118 includes a stylus tip 109 at its extremity. Adjacent to the tip 109 is the tip contact 107 which is separated from the base contact 105 by a tip insulator 117 embodied as a substantially nonconductive ring or disc (i.e., a tip insulating ring). Disposed between the base contact 105 and the body 104 of the input device 111 is a base insulator 115. The base insulator 115 can insulate the base contact 105 from the body housing 102 and body 104 of the input device 111 in cases where either the body housing 102 or the body 104 is made of a conductive alloy or metal, such as aluminum. In this way, the base insulator 115 disposed between the base contact 105 and the body 104 electrically insulates the base contact 105 from the stylus body and other stylus components, such as the button 113.

Figure 4:
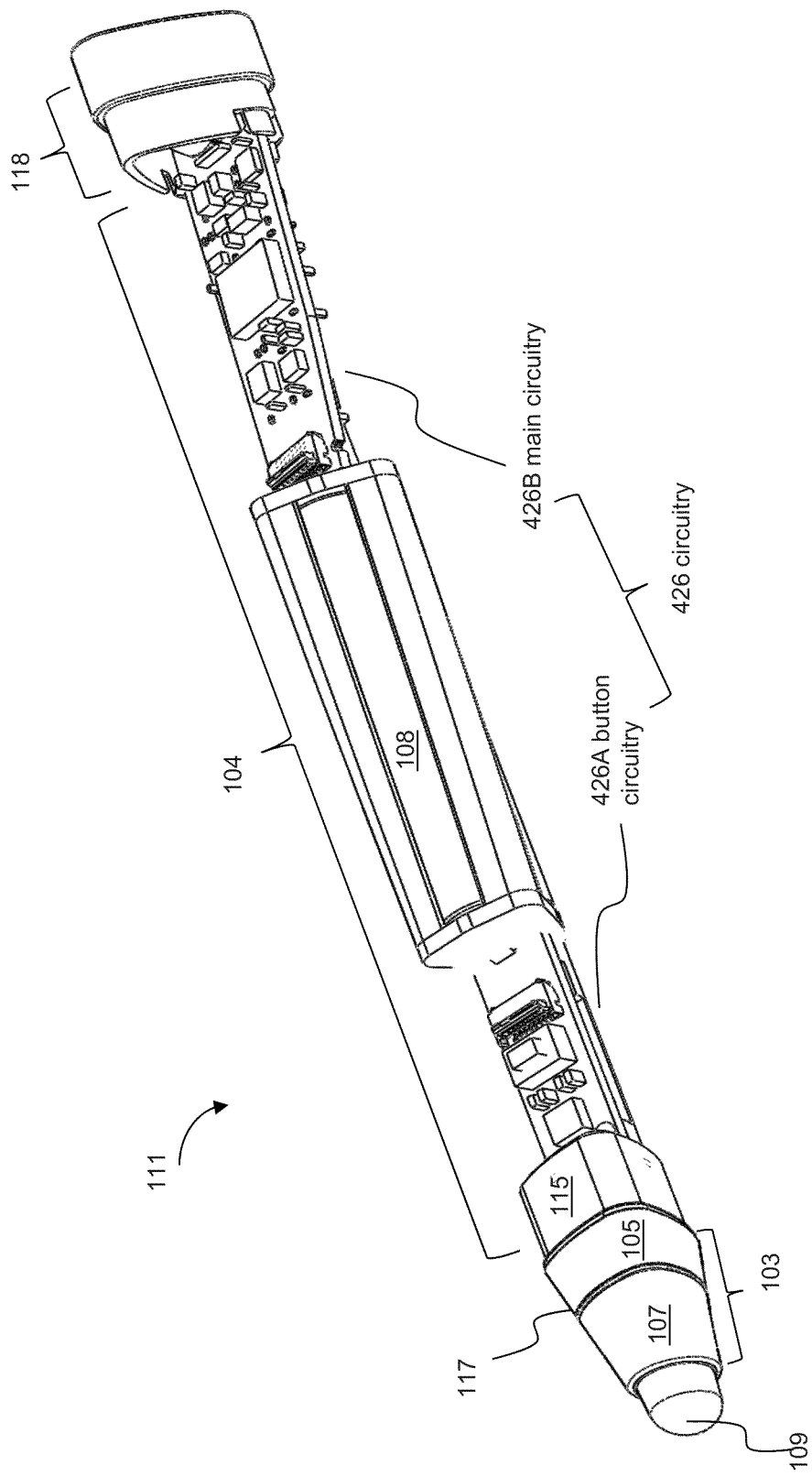
FIG. 4 provides a perspective interior of the input device illustrated in FIG. 1.

In the non-limiting example of FIG. 1, the tip contact 107 adjacent to the stylus tip 109 has been electrically connected to ground or a negative terminal of the internal power source 108 (i.e., indirectly, via a negative lead on the circuitry 426 shown in FIG. 4), while the base contact 105 is electrically connected to a positive terminal of the internal power source 108 (i.e., indirectly, via a positive lead on the circuitry 426 shown in FIG. 4). In embodiments described below with reference to FIG. 4, these are not direct connections between the contacts 105 and 107 and the terminals of the battery 108, but are instead along a power path via respective positive and negative leads on the circuitry 426 shown in FIG. 4, which is in turn connected to the terminals of the battery 108. In an alternative embodiment, the polarity of the base and tip contacts 105 and 107 can be reversed. For example, the base contact 105, which, can be electrically connected to a negative terminal of the internal power source 108 (indirectly via a negative lead on the circuitry 426 shown in FIG. 4), and tip contact 107 can be electrically connected to a positive terminal of the internal power source 108 (also indirectly, via a positive lead on the circuitry 426 shown in FIG. 4. For the sake of simplicity, electrical connections between the contacts 105 and 107 and the battery 108 are sometimes referred to in this document as connections to terminals of the battery 108. However, it is to be understood that these need not be direct connections and the power path between the contacts 105 and 107 can instead be routed through intermediate components, such as, for example, the main circuitry 426B shown in FIG. 4.

Each of the base and tip insulators 115 and 117 may be comprised of a substantially nonconductive material, such as plastic, so as to insulate the base contact 105 from the body 104. This may be needed in order to electrically insulate base contact 105 from the body 104 in cases where the body 104 is made of a conductive alloy or metal. In an embodiment, a nonconductive base insulator 115 is disposed between the base contact 105 and the body 104 to electrically insulate the base contact 105 from the stylus body 104 and other stylus components.

As used herein, a "battery" can be any energy storage device capable of providing electrical power. As used herein, a "rechargeable battery" can be any rechargeable energy storage device capable of receiving a charge, storing energy (i.e., received electrical power), and providing power. For example, a rechargeable battery can accept a charge from another power source—including a rechargeable power source, store energy corresponding to the charge, and then provide power corresponding to the stored energy. Thus, the internal rechargeable power source 108 shown in FIGS. 1, 2, and 4 can be any rechargeable power source with a sufficiently large energy storage capacity and power output capability to provide power to the electrical components of the input device 111. In certain embodiments, the internal rechargeable power source 108 can be a rechargeable lithium-ion (Li-ion), lithium-polymer (Li-poly), or nickel-metal hydride (NiMH) battery. It is to be understood that the internal rechargeable power source 108 can also be embodied as other energy cells or energy storage devices capable of accepting a charge from an external power source and having sufficient energy storage capacity and power output capabilities to supply power required by electrical components of the input device 111. The terms "input device" and "stylus" are used interchangeably herein to refer broadly and inclusively to any type of input device capable of interacting with a touch computing device. The terms "internal rechargeable power source," "internal rechargeable battery," "internal battery" and "battery" are used interchangeably herein to refer broadly and inclusively to any type of energy storage device capable of receiving a charge, storing energy, and providing power. Thus, it is to be understood that references to the exemplary internal rechargeable power source 108 shown in FIGS. 1, 2, and 4, as an "internal battery 108," an "internal rechargeable battery 108," a "battery 108," and/or a "rechargeable battery 108" are not limited to certain energy storage devices or technologies and instead broadly refer to any energy storage device capable of receiving a charge, storing energy, and supplying power to electrical components in the input device 111.

If the input device 111 is a pressure sensitive stylus, a tip 109 of the input device 111 may be manufactured from a smooth and/or gentle material that is not harmful to a touch screen of a touch computing device. For example, the tip 109 may be manufactured from rubber, plastic, metal, and/or any other type of material. Additionally, included within the input device 111 may be a memory, a wireless transceiver, a processing unit, and/or other components (not shown). These components within a stylus input device 111 may be distributed evenly such that the weight distribution of the stylus is balanced. The tip 109 and other components of such a stylus may be selected to provide capacitive capabilities for interacting with certain touch computing devices in addition to providing some amount of shock absorbency or vibration damping to internal components within the input device 111. For example, in one embodiment, the body housing 102 can comprise conductive materials, such as, but not limited to aluminum, or substantially nonconductive material such as an acrylonitrile butadiene styrene (ABS) plastic. In certain embodiments, an outer layer of the tip 109 can comprise a material having an American Society for Testing and Materials (ASTM) technical standard D2240 Durometer Type A scale value of about 40 (i.e., a Durometer value of about Shore A 40). Non-limiting examples of such materials are synthetic rubber (i.e., a silicone rubber) and natural rubber. The nozzle housing 103 and its contacts 105, 107 can comprise any suitable electrically conductive materials, such as, but not limited to, conductive metals and alloys. In non-limiting examples, one or both of the base and tip contacts 105 and 107 comprise an electrically conductive metal or alloy, such as, but not limited to, brass, rhodium, and aluminum.

Figure 2:
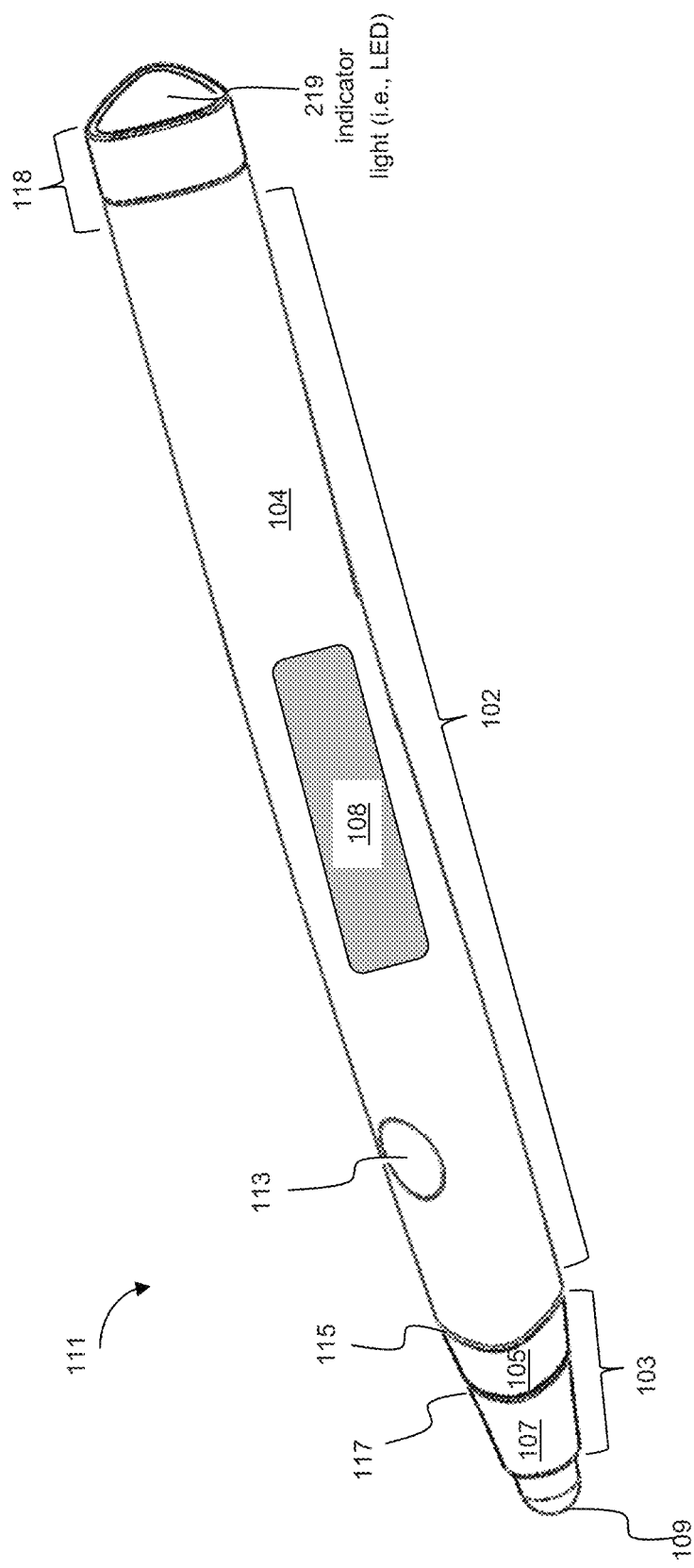
FIG. 2 provides a perspective view of the input device illustrated in FIG. 1.

FIG. 2 provides a perspective view of the input device shown in FIG. 1. As shown in FIG. 2, the input device 111 can include an indicator light, such as the exemplary LED 219. In the embodiment shown in FIG. 2, the LED 219 is located at an end of the body 104 distal from the tip 109 (i.e., at the end of the body 104 proximate to the antenna region 118) so that it can remain visible while the conductive nozzle housing 103 of the input device 111 is within a charging dock or charging unit, such as the exemplary charging unit 600 discussed below with reference to FIG. 6.

In embodiments where the antenna portion 118 is configured to receive and transmit data communications (i.e., via a Bluetooth® or other wireless communications protocol), the LED 219 can indicate a communication status for any data communications between the input device 111 and a touch computing device or an external power source. In embodiments, the LED 219 is a multi-stage red, green, and blue (RGB) LED or a multi-color white LED.

Figure 3:
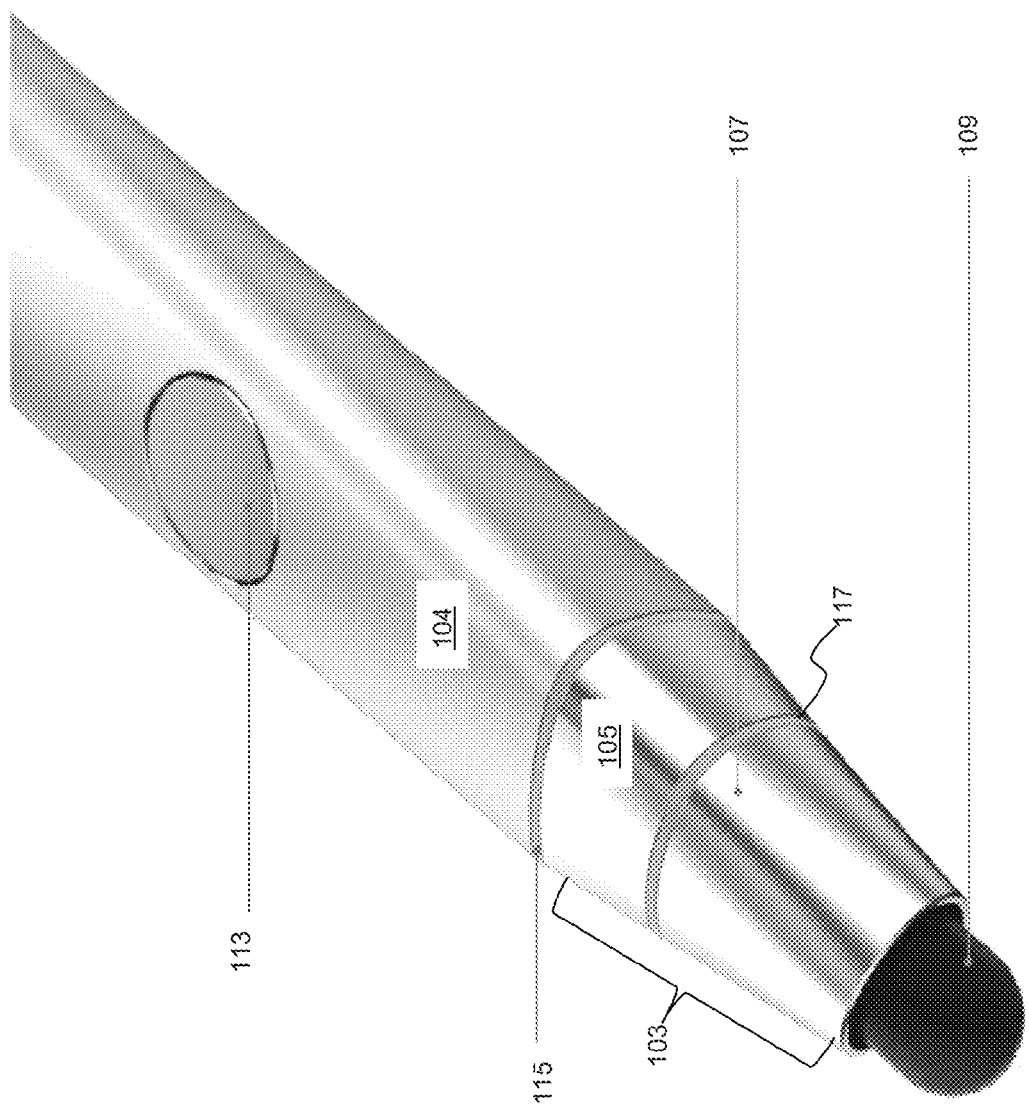
FIG. 3 provides an exterior perspective view of an input device, according to certain embodiments.

FIG. 3 provides a magnified exterior perspective view of portions of an input device. FIG. 3 is described with continued reference to the embodiments illustrated in FIGS. 1 and 2. However, FIG. 3 is not limited to those embodiments. FIG. 3 illustrates an exterior portion of a stylus input device having a physical button 113 that is slightly concave with respect to the body housing 102. The body housing 102 can comprise a metallic surface in the example provided in FIG. 3. As shown in FIG. 3, the nozzle housing 103 and its base and tip contacts 105 and 107, and the tip 109 are located at an end of the stylus near the button 113. FIG. 3 provides an enlarged, exterior view of portions of the stylus and illustrates how, in embodiments, the body 104, the button 113, and the conductive nozzle housing 103 can each comprise visually distinguishable surfaces. FIG. 3 shows an exemplary arrangement of the base and tip contacts 105 and 107 and the base and tip insulators 115 and 117 on an exterior surface of the nozzle housing 103. As shown in FIG. 3, the tip 109 protrudes from the nozzle housing 103, which is coupled to the base 104 near the base insulator 115. As shown in the non-limiting example of FIG. 3, the nozzle housing 103 can be tapered, substantially conical portion of the stylus input device 111 near the stylus tip 109.

FIG. 4 provides a perspective interior of the input device 111. FIG. 4 is described with continued reference to the embodiments illustrated in FIGS. 1-3. However, FIG. 4 is not limited to those embodiments. In particular, FIG. 4 depicts the body 104 with the body housing 102 removed, FIG. 4 shows that the input device 111 includes button circuitry 426A between the base insulator 115 and the internal battery 108. The input device 111 can also include main circuitry 426B between the internal battery 108 and the antenna region 118. In certain embodiments, only one circuit board may be used to implement the functionality of button circuitry 426A and main circuitry 426B (collectively, 'circuitry 426').

Among other functionality, the circuitry 426 is configured to provide charge protection to protecting the battery 108 from being overcharged. The circuitry also transfers electrical power received at the base and tip contacts 105, 107 via a wire, cable, lead, or other electricity transmission means to the internal rechargeable power source 108 described above with reference to FIG. 1. Thus, the base and tip contacts 105 and 107 are not directly connected to positive and negative terminals of the battery 108. Instead, wires or other electricity transmission means connect the base and tip contacts 105 and 107 to respective positive and negative leads on the circuitry. Depending on the characteristics of the external power source and the internal rechargeable power source 108, the circuitry 426 may convert the received power (i.e., alter its voltage) before it is transferred to the internal rechargeable power source 108.

For example, in embodiments, the circuitry 426 includes electronics and logic to implement a charge controller. In one embodiment, the charge controller is implemented as an integrated circuit (IC) within the main circuitry 426B. Power received via the contacts 105 and 107 is transferred to the charge controller, which in turn is connected to the battery 108. The charge controller can be implemented as a power path IC having an input for the charging voltage received via the contacts 105 and 107, and input for the battery 108 voltage, and an output for the system voltage for the input device 111, so that when the battery 108 is not charging, the input device's 111 electrical components are powered by power that the charge controller pulls or draws power from the battery 108 and outputs power to the system voltage. When the battery 108 is charging, the charge controller pulls power from the charging voltage received via the contacts 105 and 107 and supplies the system voltage and the battery recharge voltage. According to these embodiments, the contacts 105 and 107 are not directly connected via wires directly to terminals of the battery 108. Instead, the contacts 105 and 107 are connected to the circuitry 426 (e.g., the main circuitry 4263), This power path via a charge controller having power management functionality allows the battery 108 to be parked or discharged as needed to protect the battery 108 from overcharging.

In instances where the input device 111 is a pressure sensitive stylus, the tip 109 can comprise a hollow rubber portion (see, e.g., tip 109 in FIG. 5B) and be configured as a pressure sensitive tip coupled to pressure sensing components within the nozzle housing 103. These pressure sensing components are adapted to convey varying levels of mechanical pressure from the tip 109 to a pressure sensor within the stylus. The stylus body and the nozzle housing 103 may include electromechanical components and pressure sensors as part of button circuitry 426A that enable the tip 109 to sense or detect many levels of pressure. Non-limiting examples of such components and sensors for a pressure sensitive stylus are described in commonly-assigned U.S. patent application Ser.

No. 13/855,997, entitled "Pressure Sensor for Touch Input Devices," by Dowd et al., which is incorporated by reference herein in its entirety.

In accordance with embodiments, the circuitry 426 includes a computer-readable storage medium with executable instructions or logic for indicating a status via the LED 219 of a stylus. The logic can be encoded into the circuitry 426, which can comprise one or more integrated circuits (ICs) on one or more printed circuit boards (PCBs). For example, the logic can be encoded in an application-specific IC (ASIC). The circuitry 426 can comprise a printed circuit board (PCB) having one or more ICs or ASICs with logic encoded on them. The logic is executable by a processor, such as a microprocessor chip included in the circuitry 426 as part of the PCB. When executed, the logic determines a status, such as a docking status, a charging status, a battery status, a pairing status, a connectivity status (i.e., electrical connectivity to an external power source), and a communication status, and indicates the determined status via the LED 219. In an embodiment, the power path IC discussed above supplies the processor of the circuitry 426 with status information and inputs that the logic can use when indicating a status via the LED 219. In an additional or alternative embodiment, an external power source, such as a the exemplary charging unit described below with reference to FIG. 6, may supply the processor of the circuitry 426 with status information and inputs that the logic can use when indicating a status via the LED 219. According to these exemplary embodiments, the processor, storage medium, and encoded logic of the circuitry 426 may not be able to determine connectivity or charging status without receiving information from the power path IC and/or an external power source.

In one embodiment, the LED 219 may change color while the input device 111 is connecting or docking with an external power source, such as, for example, the charging unit 600 shown in FIG. 6. This indication can be similar to an indication that a stylus input device 111 can convey with the LED 219 when it is pairing with a touch computing device. For example, the LED 219 may turn a solid blue and/or another color when the stylus input device 111 has determined that it has established an electrical connection with an external power supply via at least one of base contact 105 and tip contact 107. Unlike a pairing operation between a stylus input device 111 and a touch computing device, which is typically performed wirelessly and/or through touch inputs, docking with an external power source, such as the charging unit 600 shown in FIG. 6, requires an electrical connection between the base and tip contacts 105 and 107 of the input device 111 and respective charging leads or contacts (see, e.g., base and tip charging contacts 605 and 607 in FIG. 6). In order to distinguish between docking with a charging station or unit and pairing with a touch computing device, pairing may be indicated by pulsating the LED 219 in blue and/or another color while the input device 111 and the touch computing device are performing the pairing operation. Once the input device 111 has successfully docked with a charging station or unit, the LED 219 may turn off to indicate that the electrical connection has been established. In one embodiment, pulsating the LED 219 can be accomplished by logic in the circuitry 426 that causes the LED 219 to alternate between partial and full illumination to pulsate the LED 219 when the input device 111 is being charged from an external power source. The circuitry 426 can also include logic to blink the LED 219 off and on in red when the input device 111 is electrically connected to an external power source.

According to embodiments, the internal rechargeable power source 108 has a large enough energy storage capacity to supply power to electrical components of the input device 111 for an approximate duration of time without having to be recharged from an external power source. For example, the internal rechargeable power source 108 can be implemented as a battery capable of powering the LED 219, the circuitry 426, a pressure sensor, a wireless transceiver, and an antenna in the antenna region 118, and/or other electrical components of the input device 111 for a number of hours or days.

With continued reference to FIG. 4, the interior view of the base 104 of the input device 111 shows that the base insulator 115 extends into a portion of the base 104 where the conductive nozzle housing 103 is coupled to the base 104. This extension can serve to insulate the button circuitry 426A and other components of the input device 111 that are located near the end of the base 104 that is coupled to the conductive nozzle housing 103.

Exemplary Determination and Indication of a Charging Status

With reference to FIGS. 2 and 4, in embodiments, the circuitry 426 comprises a computer readable medium having instructions or logic stored or encoded thereon, that when executed by a processor, causes the processor to indicate a charging status via the LED 219. In embodiments, the status can be one or more of a charging status and a battery status. The logic can determine a charging status of a rechargeable battery of an input device 111 inserted into the charging unit 600. The logic can also determine a charging status of a rechargeable battery used as the internal rechargeable power source 108 of the charging unit 600. An exemplary charging status can be one or more of: electrical connectivity between the input device 111 and an external power source, such as, for example, the charging unit 600 of FIG. 6; charging the internal rechargeable power source 108 from an external power source, such as the charging unit 600 of FIG. 6; receiving power from an external power source; and not charging. The logic can comprise instructions to cycle the LED 219 on and off so as to iteratively blink the LED 219 when the status is that the input device 111 is connected to or receiving power from an external power source, such as the charging unit 600 of FIG. 6; alternate between partially and fully illuminating the LED 219 so as to pulsate the LED 219 when the status is charging the input device's 111 internal rechargeable power source 108; and turn off the LED 219 when the status is not charging.

Exemplary Determination and Indications of a Battery Status

In an embodiment, when executed, the logic stored on a computer readable medium on the circuitry 426 can determine a battery's status based on a state of charge (SOC) of the battery, wherein the SOC is measured as a percentage of available power as compared to the battery's maximum energy storage capacity. In cases where multi-cell batteries are used, the SOC of a battery can be determined based on an aggregate SOC of cells of the battery. The SOC of a battery can include a measurement of the current ability of the battery to supply (send) energy and to consume (receive) energy. In certain exemplary embodiments, the SOC may be a percentage that runs from 0% to 100%, where 100% means that no more energy can be stored in the battery (i.e., the battery is fully charged and cannot accept a charge). In certain embodiments, the logic may calculate the SOC from open circuit and/or closed circuit voltage levels. However, as would be understood by those skilled in the relevant art(s), a battery status in the form of an SOC of the battery may be calculated in any number of ways. The logic can determine a battery status for a rechargeable battery used as the internal rechargeable power source 108 for the input device 111. Additionally, a battery status can be determined based on an expected remaining useful life, measured as an estimated duration the battery can supply a useful level of power. In the case of the input device's 111 rechargeable battery 108, this may be expressed as an amount of time (i.e., in hours and/or minutes) the battery can provide sufficient power to operate the input device 111. For example, the LED 219 can indicate that the battery of the input device 111 is substantially depleted in response to determining, by the logic, that the battery will be unable to power the input device 111 more than 15 minutes into the future. In the cases where a rechargeable battery used as the internal rechargeable power source 108 of the charging unit 600, the LED 219 can convey that the battery 108 is substantially depleted or nearing depletion if the logic determines that the battery 108 lacks sufficient power to recharge the input device 111. According to embodiments, a battery status can be one or more of fully charged and substantially depleted. In embodiments, the logic may determine that a battery is substantially depleted (i.e., nearly empty) when its SOC is below a certain threshold, such as 10%. According to embodiments, the logic may determine that a battery having an SOC above a certain threshold, such as 97%, is substantially charged (i.e., fully charged). It is to be understood that the SOC and useful life thresholds provided above are merely exemplary and that these thresholds can be tunable parameters changeable by a user of the input device 111.

According to embodiments, the main circuitry 426B can include instructions for cycling the LED 219 on and off a predetermined number of iterations to blink the LED 219 when a battery status is substantially depleted and instructions for illuminating the LED 219 at a maximum brightness when a battery status is fully charged. In embodiments, the number of iterations for blinking the LED 219, the rapidity of the blinking and pulsating, and the levels of brightness/illumination described herein are user-tunable parameters.

Although not shown in FIG. 2 or 4, embodiments can employ multiple LEDs having different colors, implement the LED 219 as a multi-stage RGB LED, or use other communications means, such as transmitting sounds, vibrations, or signals from the input device 111 to indicate the exemplary connectivity, charging, and battery status information discussed above. For example, a white LED can be fully illuminated to indicate a battery 108 status of fully charged, a pulsating red LED can indicate a connectivity status of electrically connected to an external power source, such as, for example, the charging unit 600 of FIG. 6, and a pulsating green LED can indicate a status of charging the internal rechargeable power source 108 from an external power source, such as, for example, the charging unit 600 of FIG. 6. Additionally, a connectivity, battery, or charging status can be communicated via an antenna in the antenna region 118 of wireless transceiver of the input device 111. For example, an input device 111 embodied as a multifunction stylus may include a wireless transceiver, such as a Bluetooth® transceiver, a wireless network transceiver, and/or some other wireless transceiver for such communications.

Exemplary Internal Nozzle Components

Figure 5A:
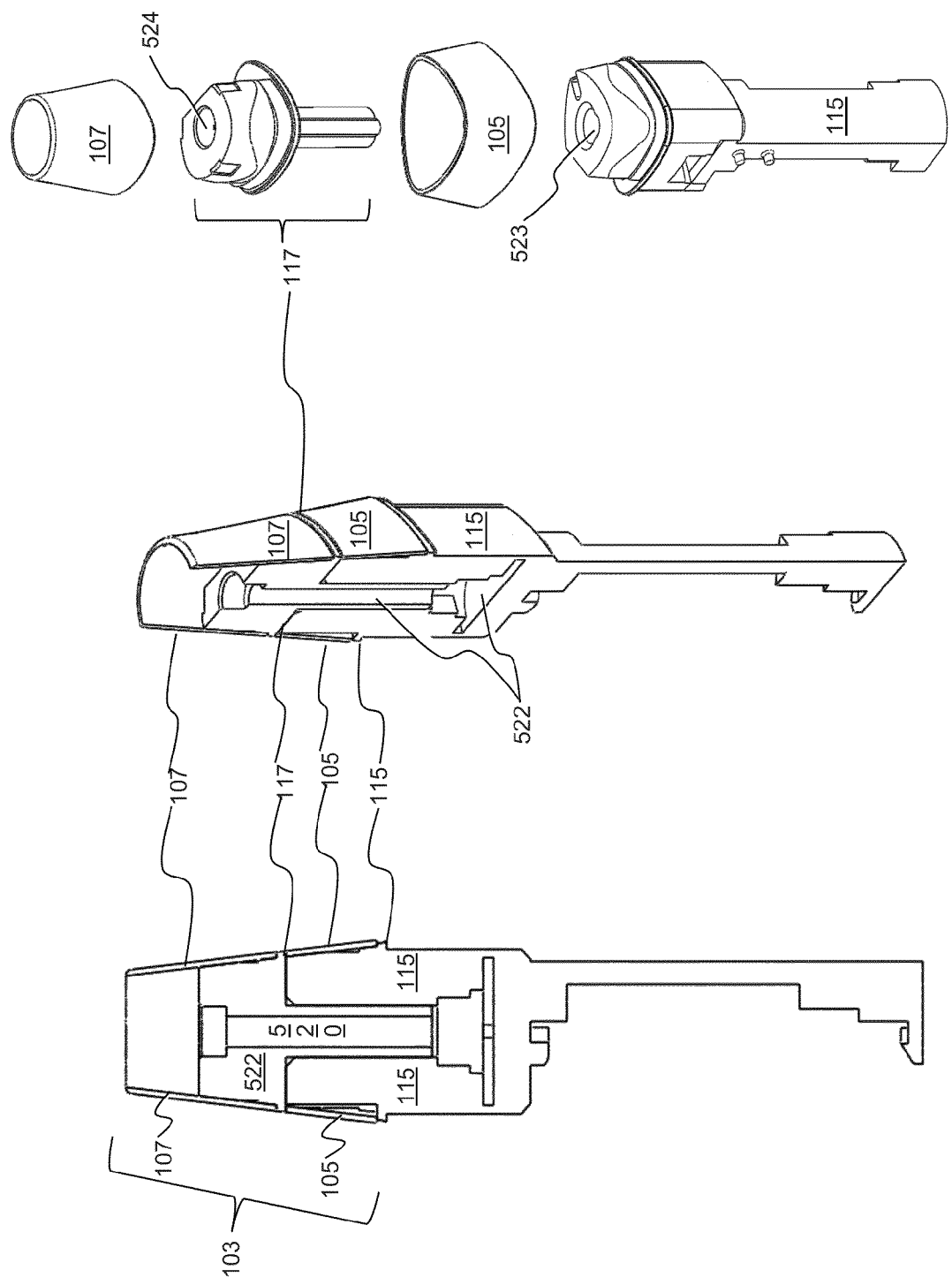

FIGS. 5A and 5B provide cross-sectional side and perspective views of exemplary contacts and insulators included in the nozzle housing 103. FIGS. 5A and 5B are described with continued reference to the embodiments illustrated in FIGS. 1-4. However, FIGS. 5A and 5B are not limited to those embodiments.

In FIGS. 5A and 5B, cross sectional views of the nozzle portion 103 show that portions of the base and tip insulators 115 and 117 inside the nozzle housing 103 form a cavity 522 which partially surrounds a slide-able element or plunger 520. As shown in the exemplary embodiments of FIGS. 5A and 5B, the cavity 522 is an internal cavity within the nozzle housing 103. In certain embodiments, the plunger 520, together with one or more additional mechanical or electro-mechanical components, serves as a coupling assembly (collectively, a coupling member) that couples the tip 109 to the body 104. In embodiments, the plunger 520 connects the tip 109 to a pressure sensor in the body 104. The pressure sensor can be located on or near the button circuitry 426A. The plunger 520 may comprise a conductive metal, such as brass, and the insulators 115 and 117 serve to prevent unwanted electrical contacts, arcs, and short circuits (i.e., shorts) between the plunger and the contacts 105 and 107. The cavity 522 allows substantially free movement of the plunger 520 in directions that are substantially parallel to a plane aligned with a lengthwise orientation of the body 104 of the input device 111. Alternatively, or in addition, the cavity 522 allows the plunger 520 to move in directions that are substantially perpendicular to or tangential to a plane corresponding to a touch surface or touch screen of a touch computing device that the input device 111 is being used with. For example, when the input device's 111 tip 109 is in contact with a touch surface, the cavity 522 allows the plunger 520 to move up and down in directions that are tangential to and/or substantially perpendicular or orthogonal to the touch computing device's touch surface.

As shown in FIG. 5A, the base insulator 115 includes a substantially cylindrical duct 523 that forms part of the cavity 522 and is adapted to allow substantially free movement of the plunger 520 between the tip 109 and a side of the cavity 522 distal from the tip 109. In embodiments where the coupling member and/or plunger 520 is not cylindrical, the cavity 522 is shaped so as to allow substantially free movement of whatever shape the coupling member and/or plunger 520 has. In an embodiment, the duct 523 may also be configured to enable a wire, lead, cable, or other electricity transmission means to transfer electrical current from the base contact 105 along a power path through to a positive terminal of the battery 108 (i.e., indirectly via a positive lead on the main circuitry 426B), a positive lead or connection on the button circuitry 426A (i.e., en route to the positive terminal of the battery 108), or a positive connection elsewhere in the input device 111 along a power path to the battery 108. In an embodiment, a wire electrically connecting the base contact 105 to a positive lead on circuitry 426 along a power path to a positive terminal of the battery 108 passes through a portion of the duct 523 in the base insulator 115 such that it is not in contact with the plunger 520. Alternatively, the wire from the base contact 105 passes through an opening in the base insulator 115 (not shown, but similar to hole 526 in the tip insulator 117 shown in FIG. 5B) to the positive lead on the circuitry 426 or another component along a power path to a positive terminal of the battery 108.

FIG. 5A also depicts a substantially cylindrical shaft 524 in the tip insulator 117 that forms part of the cavity 522 and is adapted to allow substantially free movement of the plunger 520 between the tip 109 and a side of the cavity 522 distal from the tip 109. In an embodiment, the shaft 524 may also be configured to enable a wire, lead, cable, or other electricity transmission means to electrically connect the tip contact 107 to a negative terminal of the battery 108, a negative or ground connection in the button circuitry 426A, or a ground connection elsewhere in the input device 111, such as, for example, in the main circuitry 426B.

FIG. 5B also provides a perspective view of the tip contact 107 and the tip insulator 117 with a portion of the shaft 524 extending as an elongate shaft from the side of the tip insulator 117 opposite of where the tip insulator is coupled to the tip contact 107. This elongate shaft portion of the shaft 524 can also form part of the cavity 522 that allows the plunger 520 to slide or move along an axis or plane within the nozzle housing 103 between the tip 109 and the base 104. The tip insulator 117 also includes an opening, such as the exemplary hole 526 shown in FIG. 5B. In an embodiment, the hole 526 is adapted to allow a wire, cable, lead, or other electricity transmission means from the tip contact 107 to pass through the tip insulator 117 to a negative lead on the circuitry 426 along a power path to a negative terminal of the battery 108 or a ground connection elsewhere in the input device 111. In an embodiment, a wire electrically connecting the tip contact 107 to a negative lead on the circuitry 426 or a ground connection elsewhere within the input device 111 passes through the hole 526 in the tip insulator 117 as well as the duct 523 in the base insulator 115. In embodiments, the duct 523 can be any opening or hole in the base insulator 115 adapted to accept a wire or electricity transmission means used to electrically connect the tip contact 107 to a negative lead on the circuitry 426.

Exemplary Conductive Connection with an External Power Source

FIG. 6 provides cross-sectional views of an input device 111 connected to an exemplary external power source, namely, charging unit 600. FIG. 6 is described with continued reference to the embodiments illustrated in FIGS. 1-5. However, FIG. 6 is not limited to those embodiments. In particular, FIG. 6 provides a detailed cross-sectional view of the base portion 604 of an exemplary charging unit 600 with an input device's 111 nozzle housing 103 inserted into it. The base charging contact 605 and tip charging contact 607 are shown as rounded connectors akin to leaf spring connectors that are connectable to respective base and tip contacts 105 and 107 on the nozzle housing 103. As seen in FIG. 6, the input device 111 is configured to connect to an external power source such as the charging unit 600 via the input device's 111 nozzle housing 103, which includes the tip insulator 117 disposed between base contact 105 and tip contact 107. As discussed above with reference to FIGS. 1-4, the tip insulator 117 electrically insulates base and tip contacts 105 and 107 from each other. As shown in FIG. 6, the mechanical coupling 614 can be embodied as a ring or protrusion within the base portion 604 configured to snap into a groove or indentation in the nozzle housing 103. Alternatively, the mechanical coupling 614 may be a ring, tab, or protrusion extending from the base portion into a groove or indentation in the nozzle housing 103 in order to secure the nozzle housing 103 in place such that an electrical connection is made between base contact 105 and base charging contact 605; and tip contact 107 and tip charging contact 607.

As shown in FIG. 6, the charging unit 600 is adapted to receive the input device 111 via an opening 616 in the sleeve portion 602. The opening 616 is disposed at an end of the sleeve portion 602 distal from another end of the sleeve portion 602 that is coupled to the base portion 604. The base portion 604 includes a port 606 that is connectable to a power supply via a cable, wire, lead, or other electrical transmission means (not shown). The charging unit 600 is configured to transfer an electrical current received at the port 606 to the base and tip charging contacts 605 and 607 in the base portion 604. In one non-limiting example, the port 606 is a universal serial bus (USB) port, such as a Micro USB port, and the charging unit 600 is configured to a receive a USB-compatible current at the port 606. For example, the current can have characteristics consistent with a USB standard, such as a 5 volt (5V) direct current (DC), wherein the current range is from around 500 milliamps (500 mA) to about 5 amps (5A), convert the current as needed, and then transfer a charge suitable to charge the input device's 111 internal rechargeable power source 108 to the base and tip charging contacts 605 and 607 in the base portion 604.

The mechanical coupling 614 shown in FIG. 6 is sufficiently robust to secure a stylus within the charging unit 600 and to prevent movement of the stylus within the sleeve portion 602 and/or base portion 604 that may result in the application of harmful mechanical forces to components of the stylus, such as the tip 109.

As shown in FIG. 6, an end of the input device 111 (i.e., a stylus) can be inserted into the opening 616 such that the input device's 111 nozzle housing 103 and tip 109 is positioned within the base portion 604 of the charging unit 600. In embodiments, the nozzle housing 103 comprises a conductive surface. In the non-limiting embodiments shown in FIGS. 1-6, the nozzle housing is a tapered, substantially conical housing disposed between the tip 109 and the body 104. The base portion 604 is adapted to receive the nozzle housing 103 and the tip 109 so that an electrical connection is made between the base and tip charging contacts 605 and 607 of the base portion 604 and the respective base and tip contacts 105 and 107 on the nozzle housing 103.

With continued reference to the example embodiments of FIGS. 1-4 and 6, the nozzle housing 103 includes a conductive surface with base and tip contacts 105 and 107 that can make an electrical connection with charging contacts 605 and 607 in the base portion 604. This electrical connection can be used to transfer electrical power from the charging unit 600 to the input device 111. The base portion 604 includes a mechanical coupling 614 configured to secure the nozzle housing 103 within the base portion 604 so that at least one or the base contact 105 and the tip contact 107 of the nozzle housing 103 is electrically connected to the at least one base charging contact 605 and tip charging contact 607. In the embodiment depicted in FIG. 6, the base contact 105 is in physical contact with base charging contact 605 and the tip contact 107 is in physical contact with the tip charging contact 607.

In certain embodiments, only one of the base contact 105 and the tip contact 107 need be connected to one of a charging contact 605 and 607 in order to charge the input device's 111 internal battery 108. For example, the internal battery 108 can be charged when a one of the contacts 105 and 107 that is electrically connected (via a power path including, e.g., the circuitry 426) to the positive (+) terminal of the internal battery 108 is connected to a corresponding one of the charging contacts 605 and 607 that has a positive (+) charge. In example embodiments, the other of the contacts 105 and 107 that is connected to electrical ground or a the negative (−) lead of the circuitry along a power path to a negative (−) terminal of the internal battery 108 need not be connected to a charging contact 605 or 607, provided that a suitable ground connection is made elsewhere between the input device 111 and the external power source, which is the charging unit 600 in the example of FIG. 6. Non-limiting examples of alternative ground connections can include, but are not limited to, a ground connection between a conductive portion of the input device's 111 antenna region 118 or body housing 102 and a ground lead within the charging unit's 600 sleeve portion 602, a ground connection between the input device's 111 antenna region 118 and a ground lead near the charging unit's 600 opening 616, and a ground connection between a conductive surface of the nozzle housing 103 that is insulated from whichever contact 105 or 107 is positive (+) and a ground lead within the charging unit's 600 base portion 604.

In the example embodiment of FIG. 6, the base charging contact 605 is positioned adjacent to the mechanical coupling 614 between the mechanical coupling 614 and a tip charging contact 607. In embodiments, one or both of the base and tip contacts 105 and 107 comprise a conductive metal or alloy, such as, but not limited to, brass, aluminum, copper, or rhodium. One or both of the base and tip charging contacts 605 and 607 can be spring-mounted leaf contacts configured to protrude into an interior surface of the base portion 604 facing conductive outer surfaces of the nozzle housing 103 so as to make physical contact with their respective base and tip contacts 105 and 107 on the nozzle housing 103. FIG. 6 also shows that the tip charging contact 607 is disposed between the base charging contact 605 and a cavity within the base portion 604 accommodating the tip 109.

In the non-limiting embodiment shown in FIG. 6, the base charging contact 605 is denoted with a positive sign (+) to indicate that it is electrically connected to a positive terminal of a power source and the tip charging contact 607 is denoted with a negative sign (−) to indicate that it is electrically connected to a negative terminal of the power source or a ground. In an alternative embodiment, the positions of the positive and negative contacts can be transposed. For example, the base charging contact 605 can be electrically connected to ground or a negative terminal of a power source and the tip charging contact 607 can be electrically connected to a positive terminal of the power source. In another embodiment, only the base charging contact 605 need be connected to a conductive portion of the nozzle housing 103 in order to charge the input device 111. According to this embodiment, the input device 111 within the charging unit 600 is not grounded via an electrical connection between the nozzle housing 103 and the tip charging contact 607, but is instead grounded via a conductive connection between another portion of the input device 111. For example, a conductive portion of the input device's 111 body 104 and an adjacent ground contact within the sleeve portion 602 can be used in lieu of the ground connection via the tip charging contact 607. In this example, if a stylus body is made of a conductive alloy or metal such as aluminum, the stylus can be charged using the positive base charging contact 605 and the stylus can be grounded via a connection between its body and a ground connection in the sleeve portion 602 without requiring a ground connection between the nozzle housing 103 and the tip charging contact 607. Additional details of the coupling and electrical connection between the base portion 604 and the nozzle housing 103 of the stylus are described below with reference to FIG. 6.

In the non-limiting example of FIG. 6, the tip charging contact 607 adjacent to the stylus tip 109 has been electrically connected to ground or a negative terminal of a power source is in physical contact with the tip contact 107, while the base charging contact 605 is electrically connected to a positive terminal of a power source and is in physical contact with the base contact 105. As discussed above with regard to FIG. 6, in an alternative embodiment, the polarity of the base and tip charging contacts 605 and 607 and their respective base and tip contacts 105 and 107 can be reversed. For example, the base charging contact 605, which is in physical contact with the base contact 105, can be electrically connected to a negative terminal of an external power source, and the tip charging contact 607, which is in physical contact with the tip contact 107, can be electrically connected to a positive terminal of the power source. The mechanical coupling 614 may be comprised of a substantially nonconductive material, such as plastic, so as to insulate the base contact 105 from the body 104. This may be needed in order to electrically insulate base contact 105 from the body 104 in cases where the body 104 is made of a conductive alloy or metal. In an embodiment, a nonconductive insulator (see, e.g., base insulator 115 in FIG. 1) is disposed between the base contact 105 and the body 104 to electrically insulate the base contact 105 from the stylus body and other stylus components. Non-limiting examples of arrangements and compositions of charging units having charging contacts adapted to electrically connect to a nozzle housing are described in commonly-assigned U.S. patent application Ser. No. 13/841,089 entitled "Mobile Charging Unit for Input Devices," filed Mar. 15, 2013, which is incorporated by reference herein in its entirety.

As shown in FIG. 6, the base portion 604 includes a cavity facing an opening 616 in a sleeve portion 602 of the charging unit 600 where the sleeve portion 602 is coupled to the base portion 604. In alternative embodiments, the charging unit 600 can comprise a single housing with the opening 616 at one end adapted to receive the input device 111 to be charged and a cavity at another end adapted to receive the end of the input device 111 having the conductive nozzle housing 103 with its base and tip contacts 105 and 107. Regardless of whether a single housing or sleeve and base portions 602 and 604 are used, the cavity in the base portion 604 of the charging unit 600 is distal from the opening 616. The cavity is shaped and adapted to receive an end of the input device 111 including the conductive nozzle housing 103 and the tip 109. FIG. 6 shows that the cavity includes the mechanical coupling mechanism 614 configured to secure the end of the input device 111. In FIG. 6, the mechanical coupling is depicted as grooves, which can encircle at least part of the input device's 111 body 104 or nozzle housing 103. In the embodiment shown in FIG. 6, a protruding ring or tab on the input device 111 near where the nozzle housing 103 meets the body of a stylus input device 111 is shaped such that it can snap into the grooved portion of the mechanical coupling 614. The mechanical coupling 614 can also comprise one or more indentations in the cavity configured to accept a mechanical connection (i.e., a snap-in connection) from tabs or protrusions on an exterior surface of the input device 111, such as the nozzle housing 103. In alternative embodiments, the mechanical coupling 614 can comprise a tab, ring, or other protrusion on an interior surface of the sleeve portion 602 or the cavity of the base portion 604 so that the protrusion can snap into a groove or indentation on an external surface of the input device 111 such that the nozzle housing 103 will be secured within the base portion 604. The mechanical coupling 614 can comprise nonconductive semi rigid materials such as plastics. The protrusions of mechanical coupling 614 or the input device 111 can also incorporate spring mounted elements configured to secure the nozzle housing 103 in the base portion 604 so that the tip 109 is protected and the base and tip contacts 105 and 107 on the conductive surface of the nozzle housing 103 are in physical contact with their respective base and tip charging contacts 605 and 607.

Exemplary Charging Method

Figure 7:
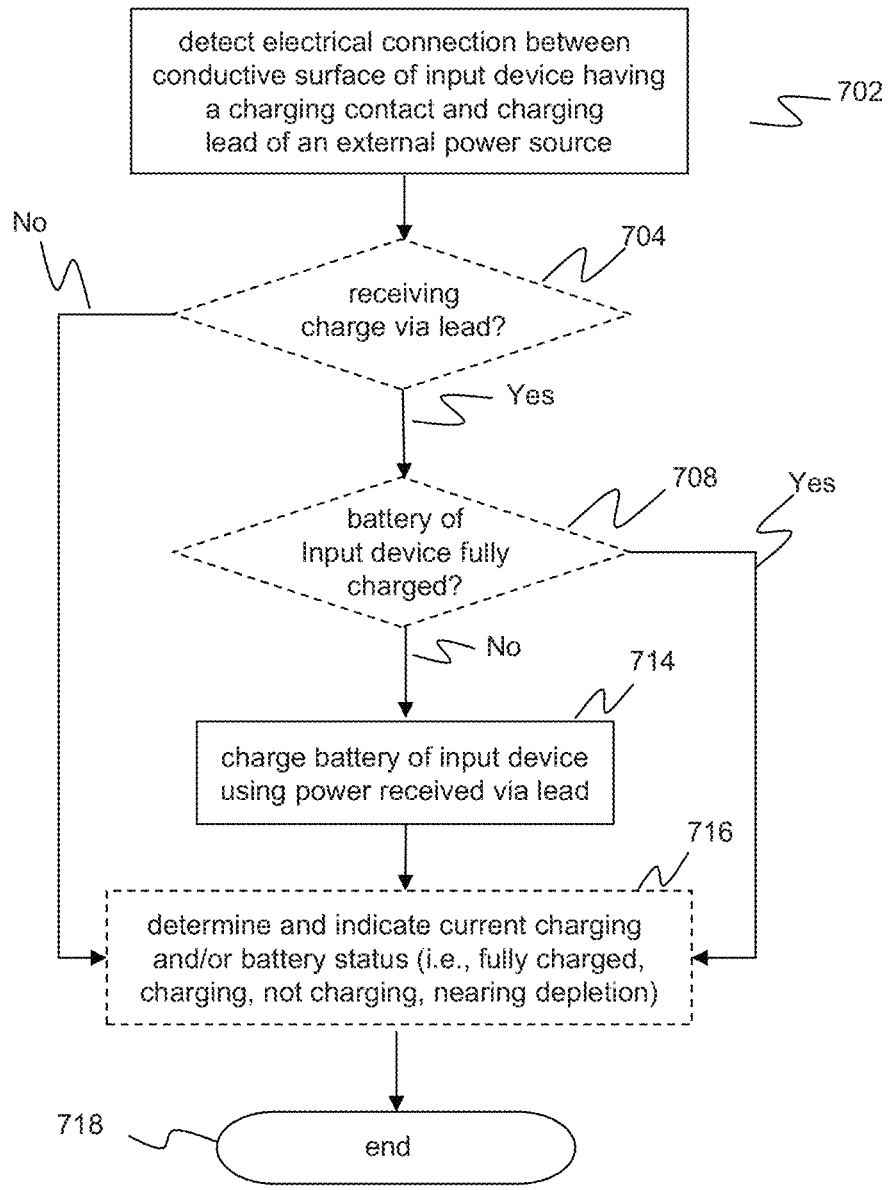
FIG. 7 is a flowchart illustrating an exemplary method for charging an input device.

FIG. 7 is a flowchart that provides one example of a method for charging the input devices described herein. FIG. 7 is described with continued reference to the embodiments illustrated in FIGS. 1-6. However, FIG. 7 is not limited to those embodiments. It is understood that the flowchart of FIG. 7 provides merely an example of the many different types of functional arrangements that may be employed to implement the charging operations of the input devices described herein. As an alternative, the flowchart of FIG. 7 may be viewed as depicting an example of steps of a method implemented by the logic and circuitry of the input device described herein according to one or more embodiments. For illustrative purposes, the method 700 is described with reference to the input device 111 and charging unit 600 implementations depicted in FIGS. 1-6. Other implementations, however, are possible. For example, instead of charging an input device 111 using power received from the exemplary charging unit 600 shown in FIG. 6, the method 700 can be performed using other suitable charging stations, docks, and apparatuses capable of providing electrical power via a connection to one or more of contacts 105, 107. The steps the charging method 700 do not necessarily have to occur in the order shown in FIG. 7 and described below. For example, in embodiments, step 716 can be performed prior to step 708, in parallel with step 714, and/or after step 714 as shown in FIG. 7. According to embodiments, some of the steps shown in FIG. 7 are optional. Optional steps are indicated in the flowchart by dashed lines (see, e.g., steps 704, 708, and 716).

Beginning with step 702, an input device detects an electrical connection between its charging contact on the input device's conductive surface and a charging contact of an external power source. In an embodiment, this step can comprise detecting, by the input device 111, of a connection of a positive base charging contact 605 at the base contact 105 of the input device 111. In this non-limiting example, step 702 comprises detecting a connection with the charging unit 600 shown in FIG. 6. In alternative embodiments, the external power source can be another charging apparatus or device such as, but not limited to, a desktop charging dock, a charging station, a charging base, a charging receptacle, or another charging device having a positive charging contact capable of physically contacting the input device's charging contact. After detecting an electrical connection to an external power source, control is optionally passed to step 704 to determine if the input device is receiving a charge via the electrical connection. If step 704 is not applicable or skipped, control is passed to step 708.

According to an exemplary embodiment, the input device 111 is configured to detect coupling to a charging unit such as the charging unit 600 depicted in FIG. 6. This detection can be accomplished through a mechanical or electrical sensor within the body 104 or the nozzle housing 103. The detection can also be accomplished in step 702 by determining that an electrical connection has been made between, e.g., a charging contact 605 or 607 of the charging unit 600 and a base contact 105 or tip contact 107 of the input device 111.

Next, in step 704, a determination is made as to whether the input device 111 is receiving a charge via the connection detected in step 702. In an embodiment, step 704 can be performed by executing logic encoded on one or both of button circuitry 426A and main circuitry 426B. Step 704 can comprise determining if a charging current (i.e., electrical power) having sufficient amperage and/or voltage is being received via one of the contacts 105, 107 via one of the charging contacts 605, 607.

In optional step 704, a determination is made as to whether the charging unit is currently receiving electrical power from the external power source. This step comprises determining if a charging current is currently being received at the input device's at least one contact (i.e., a contact indirectly connected via a power path to a positive terminal of the input device's internal battery 108) from the external power source's charging contact that was detected as being connected in step 702. In one embodiment where step 704 is executed, the external power source is a charging station, dock or unit, such as, for example, the charging unit 600 of FIG. 6. If it is determined that electrical power (i.e., energy) is not being received from an external power source, such as the charging unit 600 of FIG. 6, and that the charging unit is not connected to an external power source, such as the charging unit 600 of FIG. 6, control is passed to step 706. Otherwise, if it is determined in step 704 that the charging unit is either receiving electrical power from an external power source, such as the charging unit 600 of FIG. 6, or that the charging unit is currently connected to an external power source, such as the charging unit 600 of FIG. 6, control is optionally passed to step 708 in cases where the status of the internal battery 108 is to be ascertained prior to charging it in step 714. In an embodiment, the method 700 proceeds directly to step 714 to charge the battery without first determining its state of charge (SOC) or status and skips step 708.

In optional step 708, a determination is made as to whether a rechargeable battery of the input device 111 is fully charged or not. That is, this step determines if the input device 111 needs to be charged. In an embodiment, this step comprises calculating a state of charge (SOC) for the rechargeable battery of the input device 111. The SOC of the rechargeable battery of the input device 111 can be calculated based on a percentage of available power as compared to the total energy storage capacity of the input device's 111 battery 108. In embodiments, the determination in step 708 is based at least in part on the calculated SOC value for the rechargeable battery of the input device 111 exceeding a certain, tunable threshold (i.e., 97%). If the SOC exceeds this threshold, the rechargeable battery is determined to be fully charged and control is passed to step 718 where method 700 ends. Otherwise, if it is determined that the rechargeable battery of the input device 111 is not fully charged, control is passed to step 714.

Next, in step 714, the input device charges its rechargeable battery. This step is performed by transferring electrical power received via the connection detected in step 702 to a positive terminal of the input device's battery via a power path that can include, for example, the circuitry 426. In an embodiment, a wire, cable, lead, or other suitable electricity transmission means transfers the received power between the base contact 105 and a positive lead of the circuitry 426 en route to the battery's 108 positive terminal. The energy transfer in step 714 can be achieved via an electrical connection between the base and tip charging contacts 605 and 607 and respective base and tip contacts 105 and 107 of the nozzle housing 103 of the input device 111.

In one embodiment, the power may be converted in step 714 to a different voltage or amperage by circuitry 426 if it is determined in step 704 that the base contact 105 is receiving a current whose voltage needs to be altered or converted. For example, as discussed above with reference to FIG. 4, the circuitry 426 may determine that the voltage for power being received from an external power source needs to be reduced before the current is passed to the battery's 108 positive terminal. After the input device 111 has been charged, control is passed to optional step 716.

In optional step 716, a charging and/or battery status is determined and indicated. According to embodiments, this step can comprise determining battery and charging statuses such as the exemplary statuses of fully charged, charging, not charging, and nearing depletion shown in FIG. 7. In certain embodiments, these exemplary statuses can be separately determined for one or both of the rechargeable battery of the input device 111 and the charging unit's internal battery. For example, as discussed above with regard to FIG. 4, charging and battery statuses, such as, but not limited to, charging the internal rechargeable power source 108, the internal rechargeable power source 108 is fully charged, the internal rechargeable power source 108 is substantially depleted, and not charging can be determined. As discussed above with regard to FIG. 4, in certain embodiments, once determined, a connectivity (i.e., electrical connectivity to an external power source), battery (i.e., status of the internal rechargeable power source 108), and/or charging status can be indicated via the LED 219 of the input device 111. For example, in step 714, the LED 219 can be partially illuminated (i.e., dimmed) when the status is receiving power from an external power source, such as, for example the charging unit 600 of FIG. 6; the LED 219 can be blinked on and off a certain number of times when the status is electrically connected to an external power source; the LED 219 can be repeatedly dimmed and fully illuminated (i.e., pulsated) while the status is charging the internal rechargeable power source 108; the LED 219 can be rapidly blinked a certain number of iterations when the status is that the internal rechargeable power source 108 is substantially depleted; and the LED 219 can be fully illuminated (i.e., at a maximum brightness of the LED 219) when the status is that internal rechargeable power source 108 is fully charged. After the determined charging and/or battery status has been determined and indicated, control is passed to step 718 where the method ends.

In certain embodiments, (not shown), step 716 can be performed during execution of step 714. For example, by performing step 716 in parallel with or as part of step 714, the charging and battery status for the input device's internal rechargeable power source 108 can be determined and displayed while the internal rechargeable power source 108 is being charged. In other embodiments, step 716 can be performed prior to or as part of step 708 so that connectivity and battery statuses can be determined and displayed after it has been determined that the input device 111 is receiving a charge and before (as a part of) determining that the internal rechargeable power source 108 is fully charged.

Exemplary Computer System Implementation

Figure 8:
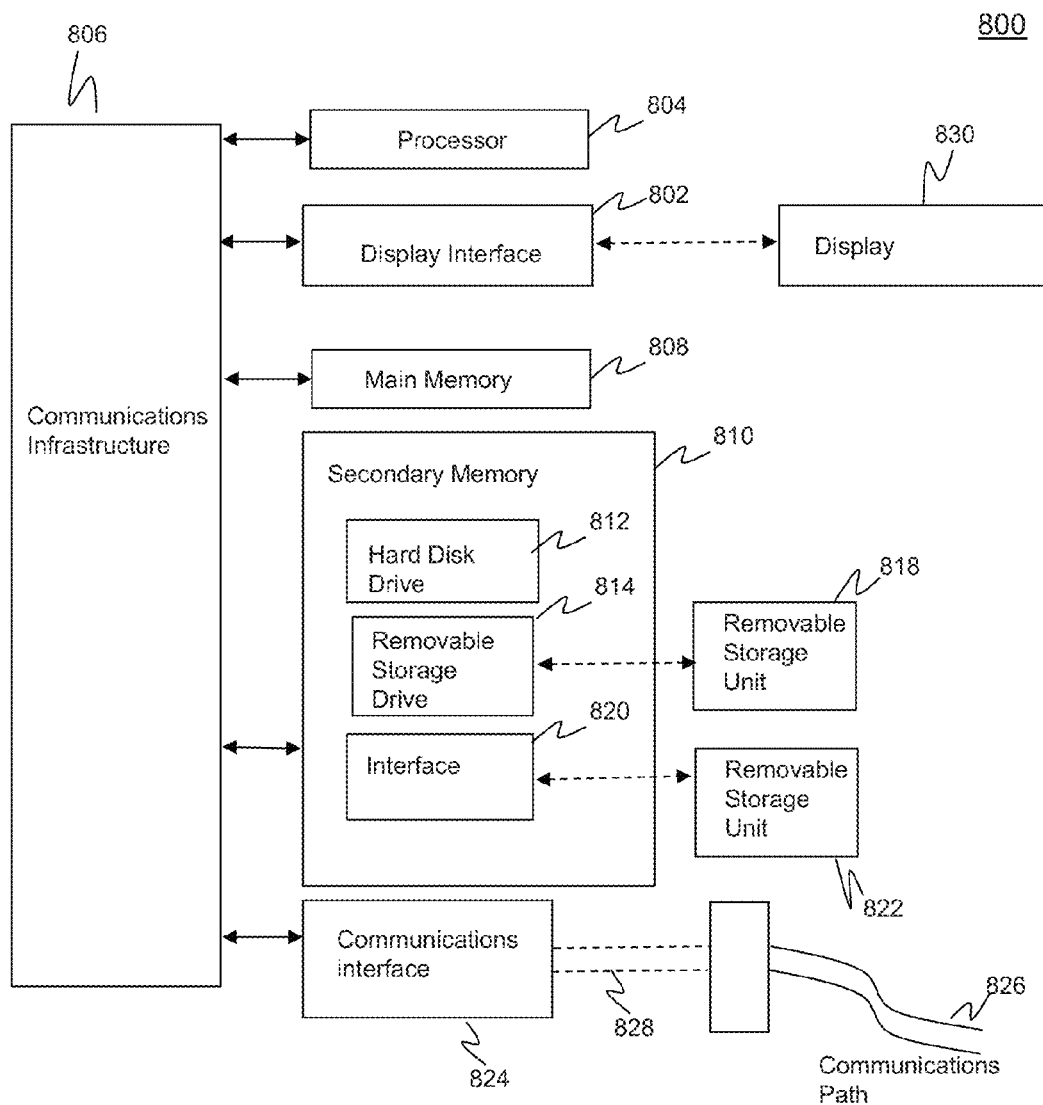
FIG. 8 is a diagram of an exemplary computer system in which embodiments of the present disclosure can be implemented.

Although exemplary embodiments have been described in terms of charging apparatuses, units, systems, and methods, it is contemplated that certain functionality described herein may be implemented in software on microprocessors and computing devices such as the computer system 800 illustrated in FIG. 8. In various embodiments, one or more of the functions of the various components may be implemented in software that controls a computing device, such as computer system 800, which is described below with reference to FIG. 8.

Aspects of the present invention shown in FIGS. 1-7, or any part(s) or function(s) thereof, may be implemented using hardware, software modules, firmware, tangible computer readable media having logic or instructions stored thereon, or a combination thereof and may be implemented in one or more computer systems or other processing systems.

FIG. 8 illustrates an example computer system 800 in which embodiments of the present invention, or portions thereof, may be implemented as computer-readable instructions or code. For example, some functionality performed by one or both of button circuitry 426A and main circuitry 426B of FIG. 4 (collectively, circuitry 426), can be implemented in the computer system 800 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the charging method 700 illustrated by the flowchart of FIG. 7 discussed above.

A computer readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor, such as processor 804, can read instructions. The instructions may include processor-specific logic or instructions generated by a compiler and/or an interpreter from code written in any suitable computer-programming language, including, for example, C, C++, C#, Visual Basic, Java, Python, Perl, JavaScript, and ActionScript.

As used herein, the term "application" refers to any program instructions or other functional components that execute on a computing device. An application may reside in the memory of a device that executes the application. As is known to one of skill in the art, such applications may be resident in any suitable computer-readable medium and execute on any suitable processor. For example, as shown in FIG. 4, the input device 111 includes a computer-readable medium as part of its circuitry 426. With reference to FIG. 8, the computer readable medium can be main memory 808 and secondary memory 810 coupled to a processor 804 that executes computer-executable program instructions and/or accesses stored information. Such a processor 804 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

As used herein, the term "computing device" refers to any computing or other electronic equipment that executes instructions and includes any type of processor-based equipment that operates an operating system or otherwise executes instructions, A computing device will typically include a processor, such as the processor 804, that executes program instructions and may include external or internal components such as a mouse, a CD-ROM, DVD, a keyboard, a display (i.e., display 830), or other input or output equipment. Examples of computing devices are personal computers, digital assistants, personal digital assistants, mobile phones, smart phones, pagers, tablet computers, laptop computers, Internet appliances, other processor-based devices, gaming devices, and television viewing devices. The exemplary computer system 800 shown in FIG. 8 can be used as special purpose computing device to provide specific functionality offered by its applications and by the interaction between their applications.

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The processor 804 may be a special purpose or a general purpose processor device. As will be appreciated by persons skilled in the relevant art, the processor 804 may also be a single processor in a multi-core/multiprocessor system, such system operating alone, or in a duster of computing devices operating in a duster or server farm. For example, the processor 804 may have one or more processor "cores." The processor 804 is connected to a communication infrastructure 806, for example, a bus, message queue, network, or multi-core message-passing scheme. At least one processor device, such as the processor 804, and a memory, such as main memory 808, may be used to implement the above-described embodiments. A processor device may be a single processor, a plurality of processors, or combinations thereof.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like.

The removable storage drive 814 reads from and/or writes to a removable storage unit 818 in a well-known manner. Removable storage unit 818 may comprise a floppy disk, magnetic tape, optical disk, etc. which is read by and written to by removable storage drive 814. As will be appreciated by persons skilled in the relevant art, removable storage unit 818 includes a non-transitory computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

As used herein the terms "computer readable medium," "non-transitory computer readable medium," and "computer usable medium" are used to generally refer to media such as removable storage unit 818, removable storage unit 822, and a hard disk installed in hard disk drive 812. Signals carried over communications path 826 can also embody the logic described herein. Computer readable medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable the processor 804 to implement the processes of the present invention, such as the steps in the method 700 illustrated by the flowchart of FIG. 7, discussed above. Accordingly, such computer programs represent controllers of the computer system 800. Where the invention is implemented using software, the software may be stored in a computer program product and loaded into computer system 800 using removable storage drive 814, interface 820, and hard disk drive 812, or communications interface 824.

Embodiments may also be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc).

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does no preclude inclusion of such modifications, variations and/or additions to the present subject matter as would be readily apparent to one of ordinary skill in the art.

What is claimed is:

1. An input device comprising:
   a tip configured to interact with a touch surface of a computing device, the tip being at an end of the input device;
   a body connected to the tip by a coupling member;
   a nozzle housing coupled to the body and encasing a portion of the coupling member between the tip and the body, the nozzle housing having a first conductive surface adjacent to the body, a second conductive surface adjacent to the tip and encasing a portion thereof, and a mechanical coupling groove configured to removably couple the first and second conductive surfaces to an external power source;
   one or more electrical components; and
   an internal rechargeable power source configured to:
      store electrical power received via an electrical connection between the external power source and the first and second conductive surface and
      supply power to the one or more electrical components.

2. The input device of claim 1, the nozzle housing further having:
   a base insulator disposed between the body and the first conductive surface, the base insulator electrically, isolating the body from the first conductive surface; and
   a tip insulator having a first portion disposed between the first conductive surface and the second conductive surface, the first portion of the tip insulator electrically isolating the first conductive surface from the second conductive surface, the second conductive surface further encasing a second portion of the tip insulator.

3. The input device of claim 1, the nozzle housing being tapered such that it is narrower at an end of the nozzle housing proximate to the tip than at another end of the nozzle housing proximate to the body.

4. The input device of claim 1, further comprising:
   a body housing encasing the body, the internal rechargeable power source, and at least one of the one or more electrical components, the body housing having an opening adapted to receive the coupling member at an end of the body housing proximate to the nozzle housing.

5. The input device of claim 1, further comprising:
   a conductive body housing encasing the body, the conductive body housing having an opening adapted to receive the coupling member at an end of the conductive body housing proximate to the nozzle housing, wherein the nozzle housing comprises a base insulator disposed between the conductive body housing and the first and second conductive surfaces, the base insulator electrically isolating the conductive body housing from the first and second conductive surfaces.

6. The input device of claim 1, further comprising:
   a base insulator disposed between the body and the first and second conductive surfaces, the base insulator having:
   an opening adapted to accept the coupling member; and
   a hole separate from the opening, wherein the internal rechargeable power source is disposed in the body, the internal rechargeable power source having a positive terminal connected via one of the one or more electrical components to the first and second conductive surfaces via a wire or other electricity transmission means passing through the hole.

7. The input device of claim 1, wherein the internal rechargeable power source comprises a battery.

8. The input device of claim 1, wherein the internal rechargeable power source is a battery, and wherein the one or more electrical components further comprise:
   a light emitting diode (LED); and
   circuitry having logic encoded thereon, that when executed by a processor,
   causes the processor to indicate a status via the LED, wherein the status is one or more of electrically connected to an external power source via the first and second conductive surfaces, receiving a charge via the first and second conductive surfaces, charging the internal rechargeable power source, the internal rechargeable power source is fully charged, the internal rechargeable power source is substantially, depleted, and not charging.

9. The input device of claim 1, wherein the internal rechargeable power source is a battery, and wherein the one or more electrical components further comprise:
   a light emitting diode (LED); and
   circuitry having logic encoded thereon, that when executed by a processor,
   causes the processor to indicate a status of the internal rechargeable power source via the LED, wherein the status is indicated by at least two of:

solidly illuminating the LED;
pulsating the LED;
turning off the LED;
pulsating the LED a first predetermined number of times;
partially illuminating the LED; and
rapidly blinking the LED a second predetermined number of times different from the first predetermined number of times.

10. The input device of claim 1, wherein:
the input device is a pressure sensitive stylus;
the tip is a capacitive tip; and
the coupling member is a slide-able member connecting the tip to a pressure sensor in the body.

11. The input device of claim 1, further comprising:
an elongate body housing encasing the body and having an opening adapted to receive the coupling member at an end of the elongate body housing proximate to the nozzle housing, wherein the coupling member is a slide-able member connecting the tip to a pressure sensor in the body, and wherein the nozzle housing includes a cavity adapted to allow substantially free movement of the slide-able member.

12. The input device of claim 1, wherein the nozzle housing is substantially conical and tapered such that it is narrower at an end of the nozzle housing proximate to the tip than at another end of the nozzle housing proximate to the body, and wherein the nozzle housing is substantially the same diameter or width as the body at a location where the nozzle housing is coupled to the body.

13. The input device of claim 1, wherein the one or more electrical components comprise:
a wireless transceiver configured to communicate with the computing device; and
a non-transitory computer readable medium configured to store content, and wherein the wireless transceiver is configured to:
provide content from the computer readable medium to the computing device; and
store content received from the computing device in the computer readable medium.

14. The input device of claim 1, further comprising:
a metallic body housing encasing the body and the one or more electrical components, wherein the one or more electrical components comprise a microprocessor, a memory, and a circuit board.

15. The input device of claim 1, further comprising:
a nonconductive body housing encasing the body, the nonconductive body housing comprising one or more of acrylonitrile butadiene styrene (ABS) plastic and silicone rubber materials.

16. A method for charging a rechargeable battery of a stylus including a tip and a body, the method comprising:
determining whether power is being received via an electrical connection between a first conductive surface of the stylus coupled to a first charging contact of an external power source, and a second conductive surface of the stylus coupled to a second charging contact of the external power source, wherein the first conductive surface is adjacent to the body of the stylus and the second conductive surface is adjacent to the tip of the stylus and encases at least a portion thereof, the electrical connection being established upon a mechanical coupling between a groove on the stylus and a protrusion within an opening of the external power source, the opening configured to receive at least the tip of the stylus;
determining an amount of power stored in the rechargeable battery; and
in response to determining that the stylus is receiving power from the external power source and that the rechargeable battery is not fully charged, charging the rechargeable battery from the external power source.

17. The method of claim 16, wherein the charging the rechargeable battery of the stylus from the external power source comprises:
transferring power received via the electrical connection to circuitry of the stylus;
converting, by the circuitry, the transferred power; and
applying a current corresponding to the converted power to a positive terminal of the rechargeable battery.

18. The method of claim 16, further comprising:
detecting that the electrical connection is established; and
in accordance with detecting that the electrical connection is established, determining a level of charge of the rechargeable battery of the stylus.

19. The method of claim 16, the stylus further including an indicator light and a non-transitory computer readable storage medium having stored thereon, instructions, that when executed by a processor, cause the processor to determine a status, wherein the status is one or more of charging the rechargeable battery, electrically connected to the external power source, receiving power from the external power source, the rechargeable battery is substantially depleted, the rechargeable battery is fully charged, and not charging, wherein the instructions comprise:
instructions for indicating the determined status by two or more of:
fully illuminating the indicator light;
pulsating the indicator light;
turning off the indicator light;
pulsating the indicator a first predetermined number of times;
partially illuminating the indicator light; and
pulsating the indicator light a second predetermined number of times different from the first predetermined number of times.

20. A stylus comprising:
a tip configured to interact with a touch surface of a computing device, the tip being at an end of the stylus;
a body;
a nozzle housing disposed between the tip and the body, the nozzle housing being coupled to the body and having:
a first conductive surface adjacent to the body
a base insulator disposed between the body and the first conductive surface, the base insulator electrically isolating the body from the first conductive surface
a second conductive surface adjacent to the tip and encasing a portion thereof
a tip insulator having a first portion disposed between the first conductive surface and the second conductive surface, the first portion of the tip insulator electrically isolating the first conductive surface from the second conductive surface, the second conductive surface further encasing a second portion of the tip insulator, and
a mechanical coupling groove configured to removably couple the first and second conductive surfaces to an external power source
one or more electrical components; and
an internal rechargeable power source configured to:
store electrical power received via an electrical connection to the external power source, the electrical connection being established when the first and second conductive surfaces are mechanically coupled to the external power source and supply power to the one or more electrical components.

* * * * *